US012615443B2

(12) United States Patent
Kunugise et al.

(10) Patent No.: US 12,615,443 B2
(45) Date of Patent: Apr. 28, 2026

(54) IMAGE DATA PROCESSING DEVICE AND IMAGE DATA PROCESSING METHOD

(71) Applicant: FUJIFILM Corporation, Tokyo (JP)

(72) Inventors: Takashi Kunugise, Saitama (JP);
Kazuyoshi Okada, Saitama (JP);
Yasunobu Kishine, Saitama (JP);
Koichi Tanaka, Saitama (JP); Yuya Hirakawa, Saitama (JP); Tatsuro Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 78 days.

(21) Appl. No.: 18/616,213

(22) Filed: Mar. 26, 2024

(65) Prior Publication Data

US 2024/0236508 A1 Jul. 11, 2024

Related U.S. Application Data

(63) Continuation of application No. PCT/JP2022/031317, filed on Aug. 19, 2022.

(30) Foreign Application Priority Data

Sep. 29, 2021 (JP) ................................. 2021-159738

(51) Int. Cl.
*H04N 23/81* (2023.01)
*H04N 23/84* (2023.01)
*H04N 25/10* (2023.01)
(52) U.S. Cl.
CPC ............. *H04N 23/81* (2023.01); *H04N 23/84* (2023.01); *H04N 25/10* (2023.01)

(58) Field of Classification Search
CPC .. H04N 23/10–12; H04N 23/81; H04N 25/10; H04N 25/11; H04N 25/13;
(Continued)

(56) References Cited

U.S. PATENT DOCUMENTS 9,372,118 B1 * 6/2016 Taplin ................... G01J 3/2803
11,122,242 B2 9/2021 Ono
(Continued)

FOREIGN PATENT DOCUMENTS

JP 2017003495 1/2017
WO 2020075523 4/2020
(Continued)

OTHER PUBLICATIONS

"International Search Report (Form PCT/ISA/210) of PCT/JP2022/ 031317", mailed on Nov. 8, 2022, with English translation thereof, pp. 1-9.
(Continued)

*Primary Examiner* — Anthony J Daniels
(74) *Attorney, Agent, or Firm* — JCIPRNET

(57) ABSTRACT
Provided are an image data processing device and an image data processing method that can generate a high-quality image. An image data processing device for processing first image data obtained by imaging light of a subject, which has been spectrally separated into a plurality of wavelengths through a band-pass filter, with an image sensor includes a processor. The processor is configured to acquire the first image data, to calculate a feature amount in a transmission wavelength range of the band-pass filter on the basis of the first image data, and to calculate information of spectral characteristics of the subject on the basis of the feature amount.

24 Claims, 17 Drawing Sheets

(58) Field of Classification Search
CPC .. H04N 25/131; H04N 25/134; H04N 25/135;
G01J 2003/2826; G01J 2003/284; G01J
2003/2843; G01J 3/2823
USPC ......................................................... 348/272
See application file for complete search history.

(56) References Cited

U.S. PATENT DOCUMENTS

| | | | |
|---|---|---|---|
| 11,726,389 B2 | 8/2023 | Kawanago et al. | |
| 11,960,200 B2 | 4/2024 | Kawanago et al. | |
| 2014/0193050 A1* | 7/2014 | Miller ...................... | G06T 5/50 |
| | | | 382/128 |
| 2022/0236463 A1 | 7/2022 | Kishine et al. | |
| 2024/0048823 A1* | 2/2024 | Yu ............................. | G01J 3/28 |
| 2024/0406586 A1* | 12/2024 | Rhoads ................ | H04N 25/706 |

FOREIGN PATENT DOCUMENTS

| | | |
|---|---|---|
| WO | 2021085367 | 5/2021 |
| WO | 2021153473 | 8/2021 |

OTHER PUBLICATIONS

"International Preliminary Report on Patentability (Form PCT/IPEA/409) of PCT/JP2022/031317", completed on Mar. 22, 2023, with English translation thereof, pp. 1-8.

* cited by examiner

FIG. 15

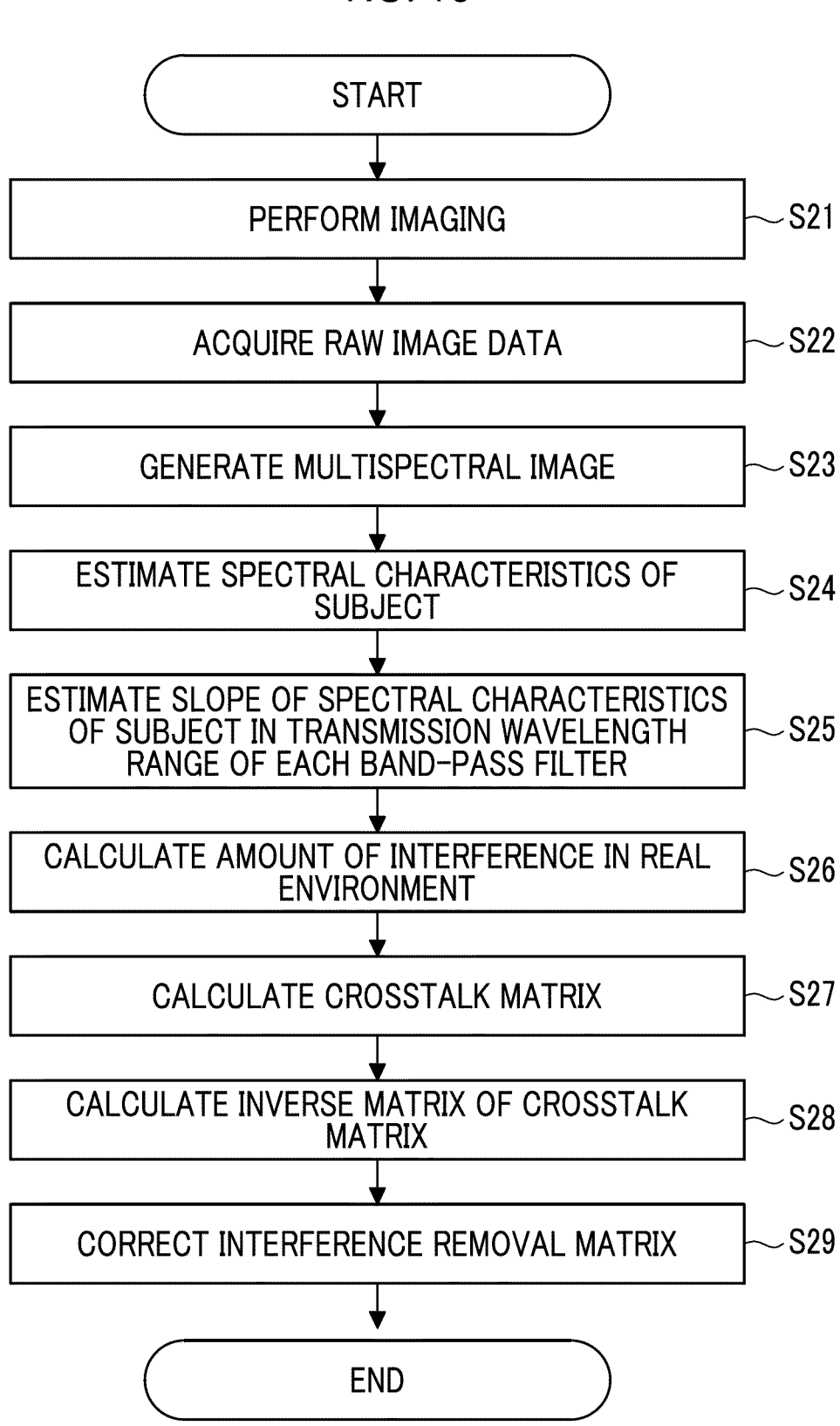

START

PERFORM IMAGING — S21

ACQUIRE RAW IMAGE DATA — S22

GENERATE MULTISPECTRAL IMAGE — S23

ESTIMATE SPECTRAL CHARACTERISTICS OF SUBJECT — S24

ESTIMATE SLOPE OF SPECTRAL CHARACTERISTICS OF SUBJECT IN TRANSMISSION WAVELENGTH RANGE OF EACH BAND-PASS FILTER — S25

CALCULATE AMOUNT OF INTERFERENCE IN REAL ENVIRONMENT — S26

CALCULATE CROSSTALK MATRIX — S27

CALCULATE INVERSE MATRIX OF CROSSTALK MATRIX — S28

CORRECT INTERFERENCE REMOVAL MATRIX — S29

END

IMAGE DATA PROCESSING DEVICE AND IMAGE DATA PROCESSING METHOD

CROSS-REFERENCE TO RELATED APPLICATIONS

The present application is a Continuation of PCT International Application No. PCT/JP2022/031317 filed on Aug. 19, 2022 claiming priority under 35 U.S.C § 119(a) to Japanese Patent Application No. 2021-159738 filed on Sep. 29, 2021. Each of the above applications is hereby expressly incorporated by reference, in its entirety, into the present application.

BACKGROUND OF THE INVENTION

1. Field of the Invention

The present invention relates to an image data processing device and an image data processing method, and more particularly, to an image data processing device and an image data processing method that generate image data of a plurality of wavelength ranges.

2. Description of the Related Art

A technique is known which performs imaging using a lens provided with a band-pass filter and a polarization filter and an image sensor provided with a color filter and a polarizer and processes the obtained image data to generate images of a plurality of wavelengths (for example, WO2020/075523A and the like).

SUMMARY OF THE INVENTION

An embodiment according to the technology of the present disclosure provides an image data processing device and an image data processing method that can generate a high-quality image.

(1) There is provided an image data processing device for processing first image data obtained by imaging light of a subject, which has been spectrally separated into a plurality of wavelengths through a band-pass filter, with an image sensor. The image data processing device comprises a processor. The processor is configured to: acquire the first image data; calculate a feature amount in a transmission wavelength range of the band-pass filter on the basis of the first image data; and calculate information of spectral characteristics of the subject on the basis of the feature amount.

(2) In the image data processing device according to (1), the image sensor may be an image sensor that is provided with a plurality of types of optical filters.

(3) In the image data processing device according to (2), the spectral characteristics may be calculated by converting the feature amount into a function.

(4) In the image data processing device according to (2) or (3), the information may be information based on a differential value of the spectral characteristics.

(5) In the image data processing device according to any one of (1) to (4), the spectral characteristics of the subject in the transmission wavelength range of the band-pass filter in the first image data may be uniform.

(6) In the image data processing device according to any one of (2) to (4), the processor may be configured to: acquire second image data; perform an image generation process on the second image data to acquire third image data based on the wavelength; calculate a second feature amount in the transmission wavelength range of the band-pass filter on the basis of the third image data; calculate second information of the spectral characteristics of the subject on the basis of the second feature amount; and calculate first data on the basis of the information and the second information.

(7) In the image data processing device according to (6), the image generation process may be an interference removal process on the second image data.

(8) In the image data processing device according to (6) or (7), in the image generation process, a pixel value corresponding to a specific wavelength range among transmission wavelength ranges of a plurality of the band-pass filters may be extracted from the second image data to generate the third image data.

(9) In the image data processing device according to any one of (6) to (8), the processor may be configured to correct the third image data using the first data.

(10) In the image data processing device according to (9), the processor may be configured to: calculate an amount of interference on the basis of the information and spectral sensitivity characteristics of the image sensor; and calculate the first data on the basis of the calculated amount of interference.

(11) In the image data processing device according to (10), the processor may be configured to: calculate an output value of a pixel of each of the optical filters with respect to light of each of the band-pass filters, on the basis of the information and the spectral sensitivity characteristics of the image sensor; and calculate, as the amount of interference, a first matrix having the calculated output value as an element.

(12) In the image data processing device according to (11), the processor may be configured to: calculate the output value of the pixel of each of the optical filters with respect to the light of each of the band-pass filters on the basis of the spectral characteristics of the subject used in a case where a parameter used in the image generation process is calculated and the spectral sensitivity characteristics of the image sensor; calculate a second matrix having the calculated output value as an element; and generate the first data on the basis of the first matrix and the second matrix.

(13) In the image data processing device according to (7), the processor may be configured to correct a parameter used in the interference removal process, using the first data.

(14) In the image data processing device according to (13), an amount of interference may be calculated on the basis of the information and spectral sensitivity characteristics of the image sensor, and the first data may be calculated on the basis of the amount of interference.

(15) In the image data processing device according to (14), the processor may be configured to: calculate an output value of a pixel of each of the optical filters with respect to light of each of the band-pass filters, on the basis of the information and the spectral sensitivity characteristics of the image sensor; and calculate, as the amount of interference, a first matrix having the calculated output value as an element.

(16) In the image data processing device according to (15), the processor may be configured to: calculate the output value of the pixel of each of the optical filters with respect to the light of each of the band-pass filters on the basis of the spectral characteristics of the subject used in a case where the parameter used in the interference removal process is calculated and the spectral sensitivity characteristics of the image sensor; calculate a second matrix having the calculated output value as an element; and generate the first data on the basis of the first matrix and the second matrix.

(17) In the image data processing device according to any one of (6) to (8), the processor may be configured to: acquire second image data; and correct the second image data using the first data.

(18) In the image data processing device according to (14), the processor may be configured to calculate the first data on the basis of the information, transmission characteristics of the band-pass filter, and the spectral sensitivity characteristics of the image sensor.

(19) The image data processing device according to any one of (6) to (15) may further comprise a memory that stores the first data.

(20) In the image data processing device according to any one of (6) to (19), the second image data may be image data of the subject acquired in an environment in which there is a fluctuation in an amount of light in the transmission wavelength range of the band-pass filter.

(21) There is provided an image data processing method for processing first image data obtained by imaging light of a subject, which has been spectrally separated into a plurality of wavelengths through a band-pass filter, with an image sensor. The image data processing method comprises: a step of acquiring the first image data; a step of calculating a feature amount in a transmission wavelength range of the band-pass filter on the basis of the first image data; and a step of calculating information of spectral characteristics of the subject on the basis of the feature amount.

BRIEF DESCRIPTION OF THE DRAWINGS

FIG. 13 is a diagram illustrating still another example of the method for calculating the feature amount.

FIG. 15 is a flowchart illustrating a procedure of a process of correcting an interference removal matrix.

DESCRIPTION OF THE PREFERRED EMBODIMENTS

Hereinafter, preferred embodiments of the present invention will be described in detail with reference to the accompanying drawings.

First Embodiment

In a multispectral camera system of a type using a lens provided with a band-pass filter and a single-plate-type color image sensor, an interference removal process is performed on image data (RAW image data) obtained by imaging to generate images (multispectral image) of a plurality of wavelengths. The interference removal process is performed by a matrix operation using predetermined parameters (interference removal parameters). The interference removal parameters are calculated in advance. For example, spectral characteristics (spectrum) of a subject are uniformly calculated in a development environment that is unlikely to be affected by disturbance light other than a light source that irradiates the subject. However, in a real environment, it is rare that the spectral characteristics of the subject in a transmission wavelength range of the band-pass filter are uniform without being affected by the disturbance light other than the light source. Therefore, in a case where the interference removal process is performed using the interference removal parameters calculated in advance (the interference removal parameters determined in a specific environment, such as a development environment, that is unlikely to be affected by the disturbance light other than the light source), there is a problem that it is not possible to obtain a correct multispectral image in the actual imaging (imaging in the real environment). That is, a phenomenon (crosstalk) in which information of other wavelengths is mixed occurs. Crosstalk occurs in a case where there is a fluctuation in the amount of light in the transmission wavelength range of the band-pass filter between the specific environment and the real environment. This fluctuation in the amount of light depends on, for example, the spectral characteristics of the subject and the light receiving sensitivity characteristics of the image sensor.

In this embodiment, the multispectral camera system capable of suppressing the occurrence of the crosstalk will be described.

[Configuration of Multispectral Camera System]

Figure 1:
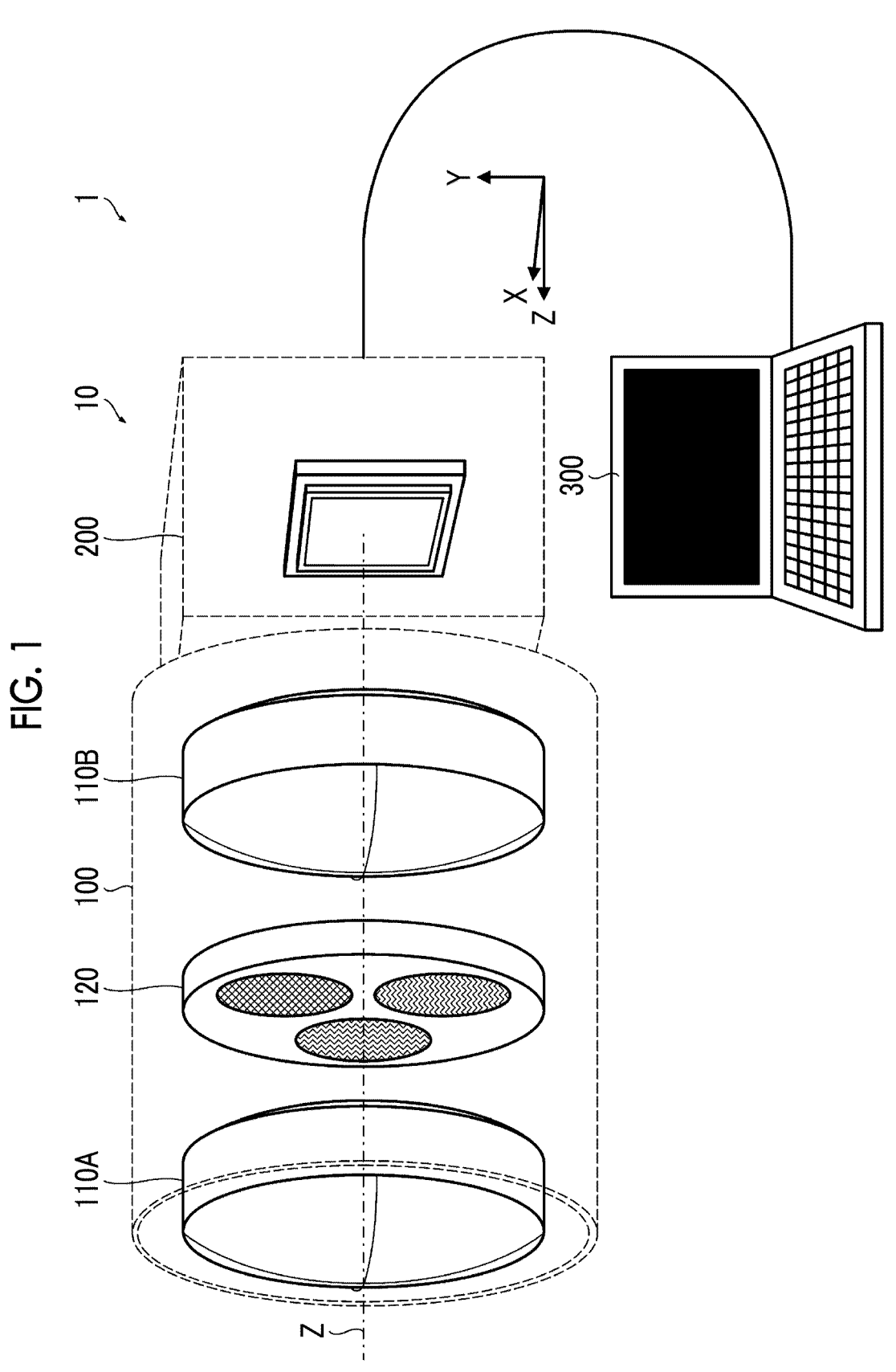
FIG. 1 is a diagram illustrating a schematic configuration of a multispectral camera system.

FIG. 1 is a diagram illustrating a schematic configuration of the multispectral camera system.

As illustrated in FIG. 1, a multispectral camera system 1 according to this embodiment comprises a multispectral camera 10 and an image data processing device 300. In addition, FIG. 1 illustrates an example of a case where a three-band multispectral image is captured.

[Multispectral Camera]

The multispectral camera 10 comprises a lens device 100 and a camera body 200.

[Lens Device]

The lens device 100 spectrally separates incident light of the subject into a plurality of wavelengths. In this embodiment, the incident light is spectrally separated into three wavelengths.

As illustrated in FIG. 1, the lens device 100 comprises a plurality of lens groups 110A and 110B and a filter unit 120. In addition, in FIG. 1, for convenience, only two lens groups 110A and 110B are illustrated.

Each of the lens groups 110A and 110B is composed of at least one lens. In FIG. 1, for convenience, each of the lens groups 110A and 110B is represented by one lens.

The filter unit 120 is disposed at a pupil position or in the vicinity of the pupil position in the lens device 100. The vicinity of the pupil position means a region that satisfies the following expression.

$$|d| < \varphi/(2 \tan \theta)$$

Here, $\theta$ is the maximum chief ray angle at the pupil position (a chief ray angle is an angle formed with respect to an optical axis), $\varphi$ is a pupil diameter, and $|d|$ is a distance from the pupil position.

Figure 2:
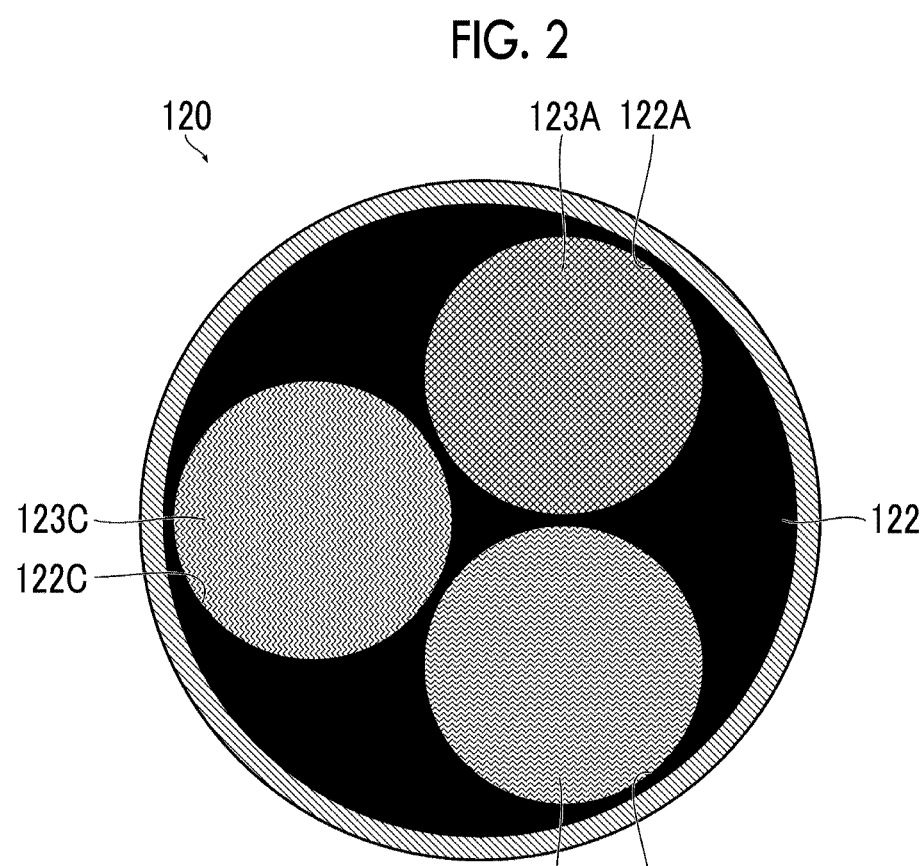
FIG. 2 is a front view illustrating a schematic configuration of a filter unit.

FIG. 2 is a front view illustrating a schematic configuration of the filter unit.

The filter unit 120 comprises a filter frame 122 and a plurality of band-pass filters (BPFs) 123A, 123B, and 123C that are mounted on the filter frame 122.

As illustrated in FIG. 2, the filter frame 122 has a plurality of opening portions 122A, 122B, and 122C. The opening portions 122A, 122B, and 122C constitute mounting portions for the band-pass filters 123A, 123B, and 123C, respectively. In this embodiment, each of the opening portions 122A, 122B, and 122C has a circular shape and is disposed at equal intervals along a circumferential direction. The shape and disposition of the opening portions 122A, 122B, and 122C are not limited thereto.

Hereinafter, as necessary, an opening portion denoted by reference numeral 122A is referred to as a first opening portion, an opening portion denoted by reference numeral 122B is referred to as a second opening portion, and an opening portion denoted by reference numeral 122C is referred to as a third opening portion such that the opening portions 122A, 122B, and 122C are distinguished.

The band-pass filters 123A, 123B, and 123C having different transmission wavelength ranges are mounted on the opening portions 122A, 122B, and 122C, respectively. The transmission wavelength ranges of the band-pass filters 123A, 123B, and 123C mounted on the opening portions 122A, 122B, and 122C, respectively, are the wavelength ranges of three images to be captured.

The band-pass filter 123A that transmits light in a first wavelength range λ1 is mounted on the first opening portion 122A. Hereinafter, as necessary, the band-pass filter 123A mounted on the first opening portion 122A is referred to as a first band-pass filter 123A to be distinguished from the other band-pass filters.

The band-pass filter 123B that transmits light in a second wavelength range λ2 is mounted on the second opening portion 122B. Hereinafter, as necessary, the band-pass filter 123B mounted on the second opening portion 122B is referred to as a second band-pass filter 123B to be distinguished from the other band-pass filters.

The band-pass filter 123C that transmits light in a third wavelength range λ3 is mounted on the third opening portion 122C. Hereinafter, as necessary, the band-pass filter 123C mounted on the third opening portion 122C is referred to as a third band-pass filter 123C to be distinguished from the other band-pass filters.

With the above configuration, light incident on the lens device 100 is spectrally separated into three wavelengths by the three band-pass filters 123A, 123B, and 123C comprised in the filter unit 120.

[Camera Body]

As illustrated in FIG. 1, the camera body 200 has an image sensor 210. The image sensor 210 is disposed on the optical axis of the lens device 100 and receives light transmitted through the lens device 100.

In this embodiment, the image sensor 210 is configured as a single-plate-type color image sensor that is provided with a plurality of types of color filters. For example, in this embodiment, the image sensor 210 is configured as a single-plate-type color image sensor that is provided with three types of color filters of red (R), blue (B), and green (G). The color filter is an example of an optical filter.

The color filters are regularly disposed with respect to pixels that are disposed in a matrix. A pixel in which the color filter of red (R) is disposed is referred to as a first pixel. A pixel in which the color filter of green (G) is disposed is referred to as a second pixel. A pixel in which the color filter of blue (B) is disposed is referred to as a third pixel. In the image sensor, three pixels of the first pixel, the second pixel, and the third pixel form a set, and a block of the one set of pixels (pixel block) is regularly arranged. As will be described below, the interference removal process is performed in units of pixel blocks.

The image sensor 210 is configured as, for example, a complementary metal oxide semiconductor (CMOS) type comprising a driving unit, an analog-to-digital converter (ADC), a signal processing unit, and the like. In this case, the image sensor 210 is driven by the built-in driving unit to operate. Further, a signal of each pixel is converted into a digital signal by the built-in ADC and is then output. Furthermore, the built-in signal processing unit performs, for example, a correlated double sampling process, gain processing, and a correction process on the signal of each pixel, and outputs the signal. The signal processing may be performed after the signal is converted into the digital signal or may be performed before the signal is converted into the digital signal. As the image sensor 210, for example, a charge-coupled device (CCD) type can also be adopted in addition to the above-described CMOS type.

The camera body 200 comprises, for example, an output unit (not illustrated) that outputs data of an image captured by the image sensor 210 and a camera control unit (not illustrated) that controls the overall operation of the camera body 200 in addition to the image sensor 210. The camera control unit is configured as, for example, a micro processing unit (MPU) comprising a processor and a memory. The micro processing unit executes a predetermined control program to function as the camera control unit.

In addition, the data of the image output from the camera body 200 is so-called RAW image data. That is, the data is unprocessed image data. The image data processing device 300 processes the RAW image data to generate an image spectrally separated into a plurality of wavelengths.

[Image Data Processing Device]

The image data processing device 300 processes the image data (RAW image data) output from the camera body 200 of the multispectral camera 10 to generate a multispectral image. More specifically, image of wavelengths corresponding to the transmission wavelength ranges $\lambda_1$, $\lambda_2$, and $\lambda_3$ of the band-pass filters 123A, 123B, and 123C provided in the lens device 100 are generated.

Figure 3:
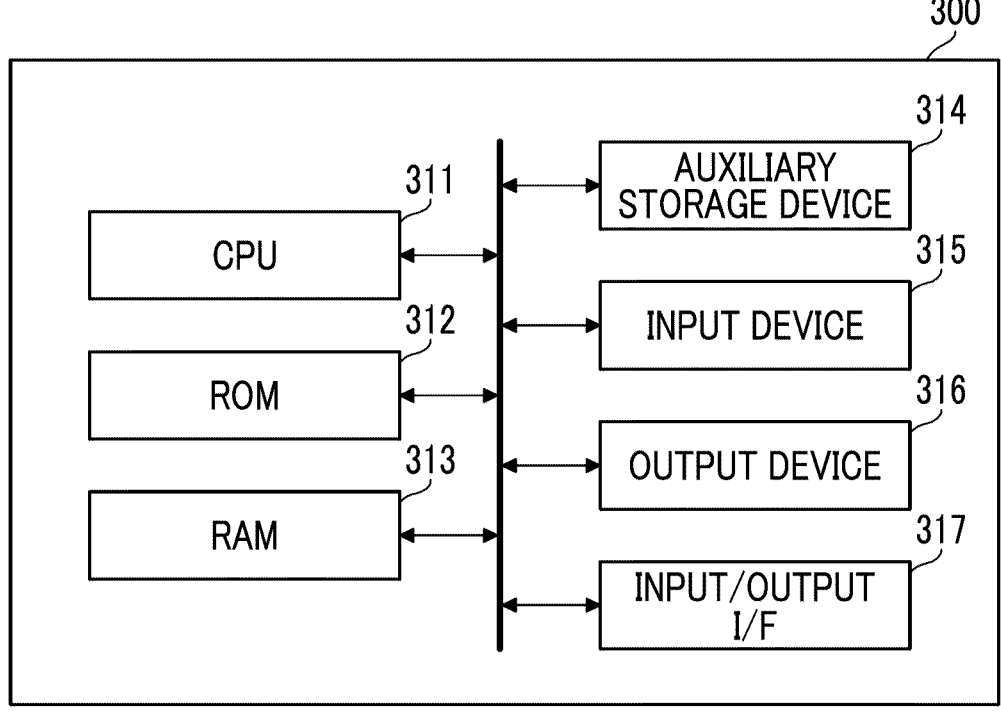
FIG. 3 is a diagram illustrating an example of a hardware configuration of an image data processing device.

FIG. 3 is a block diagram illustrating an example of a hardware configuration of the image data processing device.

As illustrated in FIG. 3, the image data processing device 300 comprises, for example, a central processing unit (CPU) 311, a read only memory (ROM) 312, a random access memory (RAM) 313, an auxiliary storage device 314, an input device 315, an output device 316, and an input/output interface (I/F) 317 and has a so-called computer configuration. That is, a computer (in a narrow sense, a CPU) executes a predetermined program (image data processing program) to function as the image data processing device 300.

The auxiliary storage device 314 constitutes a storage unit of the image data processing device 300. The auxiliary storage device 314 is composed of, for example, a hard disk drive (HDD) and a solid state drive (SSD). The program executed by the CPU 311 is stored in the auxiliary storage device 314 or the ROM 312.

The input device 315 constitutes an operation unit of the image data processing device 300. The input device 315 is composed of, for example, a keyboard, a mouse, and a touch panel.

The output device 316 constitutes a display unit of the image data processing device 300. The output device 316 is configured as, for example, a display such as a liquid crystal display or an organic light emitting diode display.

The input/output interface 317 constitutes a connection unit of the image data processing device 300. The image data processing device 300 is connected to the camera body 200 of the multispectral camera 10 through the input/output interface 317.

Figure 4:
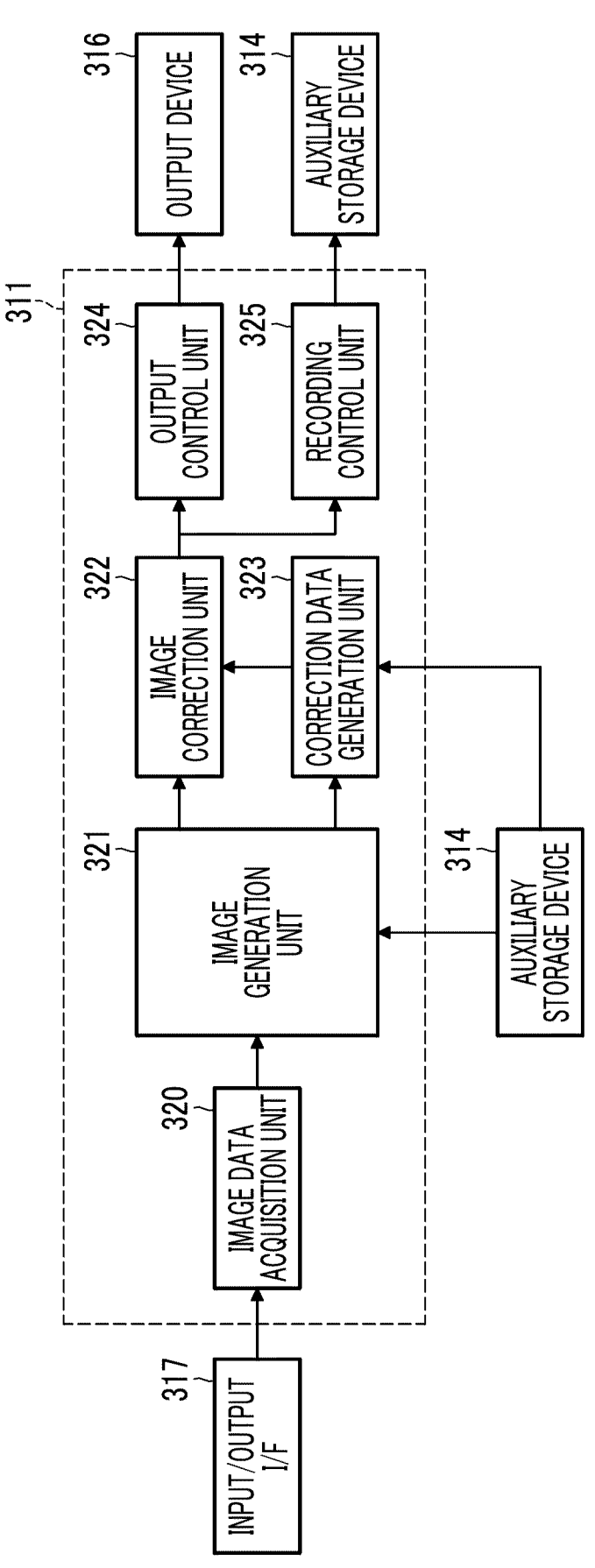
FIG. 4 is a block diagram illustrating main functions implemented by the image data processing device.

FIG. 4 is a block diagram illustrating main functions implemented by the image data processing device.

As illustrated in FIG. 4, the image data processing device 300 has the functions of an image data acquisition unit 320, an image generation unit 321, an image correction unit 322, a correction data generation unit 323, an output control unit 324, and a recording control unit 325. The CPU 311 executes a predetermined program (image data processing program) to implement each of the functions.

The image data acquisition unit 320 acquires the image data obtained by imaging from the multispectral camera 10. As described above, the image data acquired from the multispectral camera 10 is RAW image data. The image data is acquired through the input/output interface 317.

The image generation unit 321 performs a process of performing predetermined signal processing on the image data (RAW image data) acquired by the image data acquisition unit 320 to generate a multispectral image. Specifically, the image generation unit 321 performs the interference removal process on the RAW image data to generate the multispectral image. In this embodiment, an image (first image) of the first wavelength range $\lambda 1$, an image (second image) of the second wavelength range $\lambda 2$, and an image (third image) of the third wavelength range are generated as the multispectral image. The interference removal process is performed by performing a matrix operation in units of pixel blocks using an interference removal matrix.

Here, assuming that an output value (pixel value) of the first pixel is y1, an output value (pixel value) of the second pixel is y2, an output value (pixel value) of the third pixel is y3, a pixel value of the corresponding pixel in the generated first image is x1, a pixel value of the corresponding pixel in the second image is x2, and a pixel value of the corresponding pixel in the third image is x3, x1, x2, and x3 are calculated by the following expression using a matrix $A^{-1}$.

$$\begin{bmatrix} x1 \\ x2 \\ x3 \end{bmatrix} = A^{-1} \begin{bmatrix} y1 \\ y2 \\ y3 \end{bmatrix}$$

The matrix $A^{-1}$ is the interference removal matrix. In this embodiment, a matrix of three rows and three columns is given as the interference removal matrix.

$$A^{-1} = \begin{bmatrix} a_{11} & a_{12} & a_{13} \\ a_{21} & a_{22} & a_{23} \\ a_{31} & a_{32} & a_{33} \end{bmatrix}$$

Each element ($a_{11}$, $a_{12}$, . . . ) of the interference removal matrix $A^{-1}$ is an interference removal parameter. The interference removal parameter is an example of a parameter used in the interference removal process. Information of the interference removal parameters is stored in, for example, the auxiliary storage device 314. The image generation unit 321 acquires the information of the interference removal parameters from the auxiliary storage device 314 and performs the interference removal process to generate the multispectral image. The interference removal process is an example of an image generation process. A pixel value corresponding to the transmission wavelength range of each band-pass filter is extracted and an image (multispectral image) of each wavelength range is generated by the interference removal process.

The image correction unit 322 performs a process of correcting the multispectral image generated by the image generation unit 321. The multispectral image generated by the image generation unit 321 is an image that is generated using the interference removal matrix calculated in the specific environment. Therefore, in a case where the multispectral camera 10 is used in an environment different from the specific environment, it is not possible to obtain a correct multispectral image. For this reason, the multispectral image generated by the image generation unit 321 is corrected such that a correct multispectral image is obtained. The image correction unit 322 performs this correction process.

The correction data generation unit 323 performs a process of generating data for image correction to be used by the image correction unit 322. A method for generating the data for image correction and a method for correcting the multispectral image using the generated data will be described in detail below.

The output control unit 324 controls the output of the multispectral image generated by the image generation unit 321. In this embodiment, the output control unit 324 controls the output to the display which is the output device 316.

The recording control unit 325 controls the recording of the multispectral image generated by the image generation unit 321 in response to an instruction from the user. The generated multispectral image is recorded on the auxiliary storage device 314.

[Correction of Multispectral Image]

(1) Outline

As described above, the image generation unit 321 performs the interference removal process on the RAW image data acquired by the image data acquisition unit 320 to generate the multispectral image. An interference removal matrix calculated in the specific environment is used as the interference removal matrix used in the interference removal process. In general, in the specific environment, the interference removal matrix is calculated by excluding the influence of disturbance light other than the light source to uniformize the spectral characteristics of the subject in the transmission wavelength range of the band-pass filter. Therefore, crosstalk occurs in a case where the spectral characteristics of the subject to be actually imaged are not uniform. The crosstalk occurs in a case where the spectral characteristics of the subject to be actually imaged have a slope in the transmission wavelength range of the band-pass filter. Therefore, the image data processing device 300 according to this embodiment estimates the slope and corrects the slope to obtain a correct multispectral image.

(2) Functions of Correction Data Generation Unit

Figure 5:
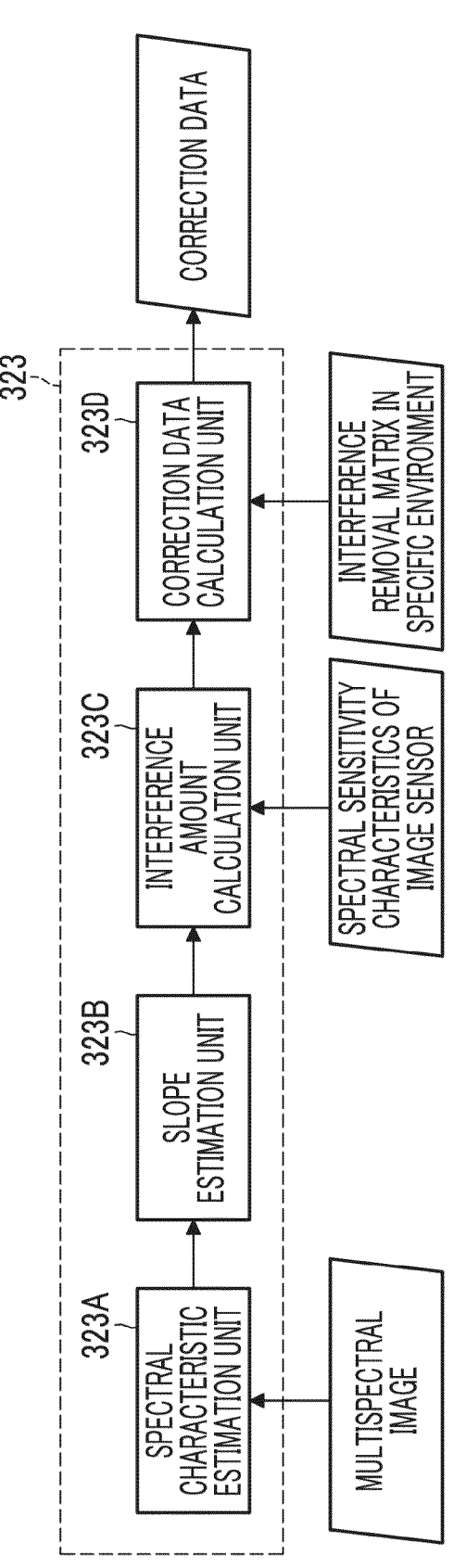
FIG. 5 is a block diagram illustrating main functions of a correction data generation unit.

FIG. 5 is a block diagram illustrating main functions of the correction data generation unit.

As illustrated in FIG. 5, the correction data generation unit 323 mainly has functions of a spectral characteristic estimation unit 323A, a slope estimation unit 323B, an interference amount calculation unit 323C, and a correction data calculation unit 323D.

The spectral characteristic estimation unit 323A performs a process of estimating the spectral characteristics (spectrum) of the subject from the multispectral image of the subject generated by the image generation unit 321.

Figures 6, 7:
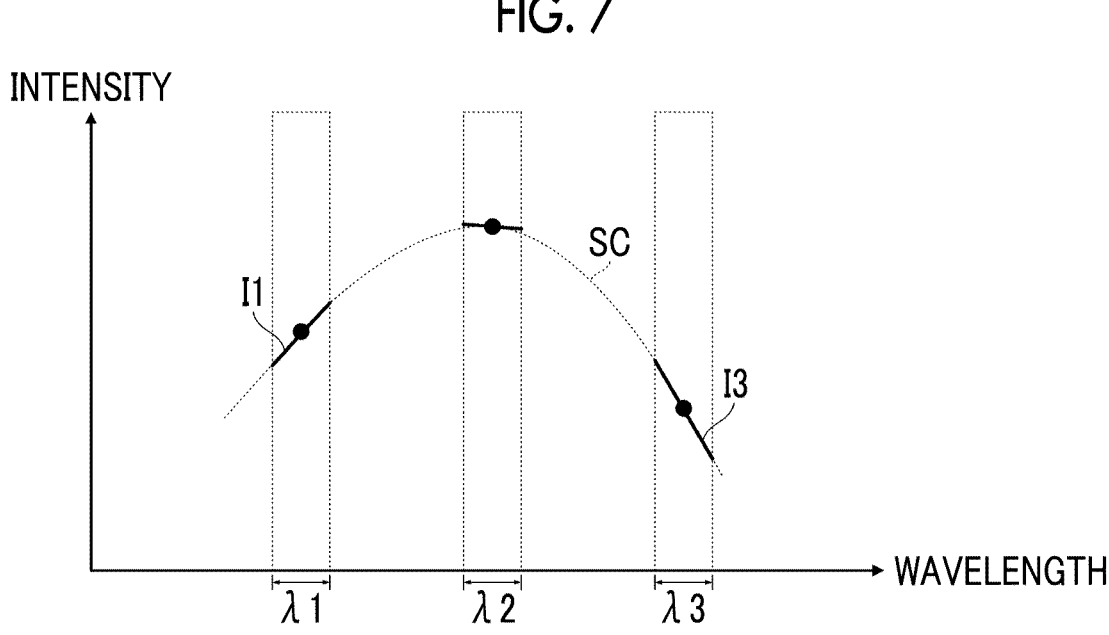
FIG. 6 is a conceptual diagram illustrating a process of estimating spectral characteristics of a subject from a multispectral image.
FIG. 7 is a conceptual diagram illustrating a process of estimating a slope of the spectral characteristics of the subject within a transmission wavelength range of a band-pass filter.

FIG. 6 is a conceptual diagram illustrating the process of estimating the spectral characteristics of the subject from the multispectral image.

As illustrated in FIG. 6, in this embodiment, the intensities (brightnesses) of the images (the first image, the second image, and the third image) of the wavelength ranges $\lambda 1$, $\lambda 2$, and $\lambda 3$ are plotted, and spectral characteristics SC of the subject are estimated by curve fitting. A known method (for example, a least square method or the like) can be adopted as the curve fitting.

As described above, the spectral characteristics of the subject are acquired by converting information of the intensity (brightness) of the image of each wavelength range discretely obtained into a function. The spectral characteristics SC of the subject in the transmission wavelength ranges $\lambda 1$, $\lambda 2$, and $\lambda 3$ of the band-pass filters estimated by the spectral characteristic estimation unit 323A are an example of a feature amount.

The slope estimation unit 323B performs a process of estimating a slope of the spectral characteristic SC of the subject within the transmission wavelength range of the band-pass filter from the spectral characteristics SC of the subject estimated by the spectral characteristic estimation unit 323A.

FIG. 7 is a conceptual diagram illustrating the process of estimating the slope of the spectral characteristics of the subject within the transmission wavelength range of the band-pass filter.

As illustrated in FIG. 7, slopes I1, I2, and I3 of the spectral characteristics SC of the subject in the transmission wavelength ranges $\lambda 1$, $\lambda 2$, and $\lambda 3$ of each of the band-pass filters are estimated from the spectral characteristics SC of the subject estimated by the spectral characteristic estimation unit 323A. For example, in this embodiment, differential values at the center points of the transmission wavelength ranges $\lambda 1$, $\lambda 2$, and $\lambda 3$ are calculated to estimate the slopes I1, I2, and I3. That is, the calculated differential values are estimated as the slopes I1, I2, and I3 of the spectral characteristics SC of the subject within the wavelength ranges $\lambda 1$, $\lambda 2$, and $\beta$.

The slopes I1, I2, and I3 of the spectral characteristics SC of the subject in the transmission wavelength ranges $\lambda 1$, $\lambda 2$, and $\lambda 3$ of the band-pass filters estimated by the slope estimation unit 323B are examples of information of the spectral characteristics of the subject.

The interference amount calculation unit 323C performs a process of calculating the amount of interference (the amount of crosstalk) in the real environment on the basis of the estimated slopes and the information of the spectral sensitivity characteristics of each pixel of the image sensor.

Figure 8:
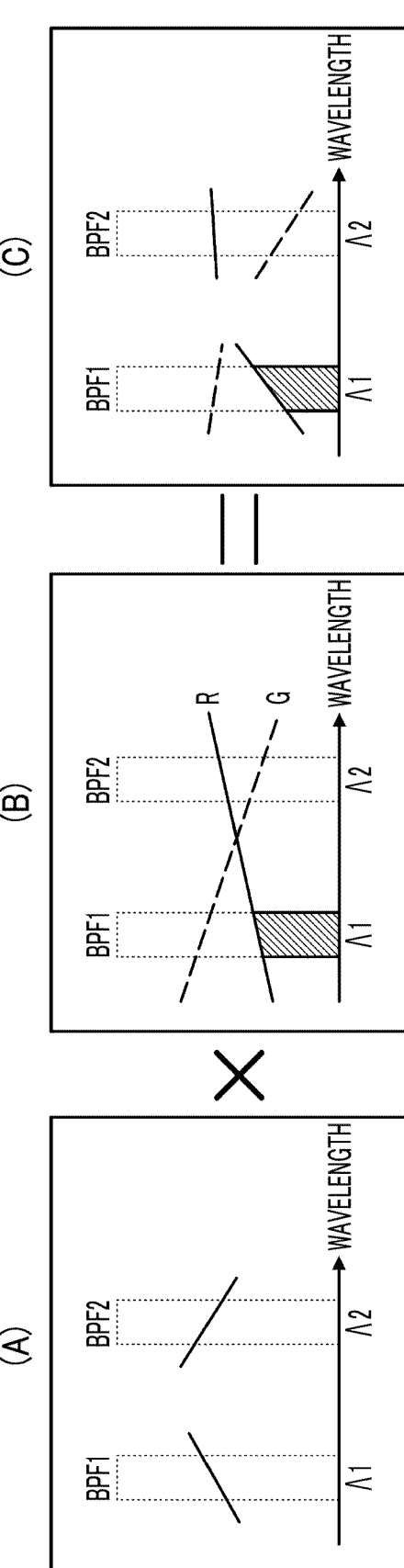
FIG. 8 is a conceptual diagram illustrating a process of calculating an amount of interference.

FIG. 8 is a conceptual diagram illustrating a process of calculating the amount of interference.

Here, for simplicity of description, an example of a case where the number of band-pass filters comprised in the lens device is two and the number of types of color filters (types of pixels) comprised in the image sensor is two will be described. It is assumed that the two band-pass filters are BPF1 and BPF2 and the transmission wavelength ranges of the band-pass filters BPF1 and BPF2 are $\Lambda 1$ and $\Lambda 2$, respectively. In addition, it is assumed that the types of color filters comprised in the image sensor are red (R) and green (G).

(A) of FIG. 8 illustrates the slopes of the spectral characteristics of the subject in the transmission wavelength ranges $\Lambda 1$ and $\Lambda 2$ of the two band-pass filters BPF1 and BPF2.

Further, (B) of FIG. 8 illustrates the spectral sensitivity characteristics of the R pixel and the G pixel of the image sensor. The R pixel is a pixel in which a red (R) color filter is disposed. The G pixel is a pixel in which a green (G) color filter is disposed. In (B) of FIG. 8, a solid line indicates the spectral sensitivity characteristics of the R pixel. Further, a broken line indicates the spectral sensitivity characteristics of the G pixel.

An integrated value (sensor response) of the spectral sensitivity of the subject and the spectral sensitivity of the image sensor in the transmission wavelength ranges $\Lambda 1$ and $\Lambda 2$ of the band-pass filters BPF1 and BPF2 is calculated ((C) of FIG. 8). The calculated value corresponds to the output of the image sensor. Then, this value is the amount of interference in the real environment.

It is assumed that an output value of the R pixel with respect to the light of the band-pass filter BPF1 is denoted by $Ar_{1R}$, an output value of the R pixel with respect to the light of the band-pass filter BPF2 is denoted by $Ar_{2R}$, an output value of the G pixel with respect to the light of the band-pass filter BPF1 is denoted by $Ar_{1G}$, and an output value of the G pixel with respect to the light of the band-pass filter BPF2 is denoted by $Ar_{2G}$. In a case where the number of band-pass filters is 2 and the number of types of color filters comprised in the image sensor is 2, the amount of light in each of the band-pass filters BPF1 and BPF2 and the output value of each of the pixels R and G of the image sensor are associated with one another at four values.

The amounts of interference $Ar_{1R}$, $Ar_{2R}$, $Ar_{1G}$, and $Ar_{2G}$ are represented in the form of a matrix, and this matrix is referred to as an interference matrix Ar. In this embodiment, the interference matrix Ar is an example of a first matrix.

$$Ar = \begin{bmatrix} Ar_{1R} & Ar_{2R} \\ Ar_{1G} & Ar_{2G} \end{bmatrix}$$

As described above, the amount of interference (each element of the interference matrix) is calculated on the basis of the slope of the spectral characteristics of the subject within the transmission wavelength range of the band-pass filter and the information of the spectral sensitivity characteristics of each pixel of the image sensor.

In addition, in the above example, for simplicity of description, a case where the number of band-pass filters comprised in the lens device is 2 and the number of types of color filters comprised in the image sensor is 2 has been described. However, even in a case where the number of band-pass filters comprised in the lens device is 3 and the number of types of color filters comprised in the image sensor is 3 as in the system according to this embodiment, the amount of interference can be calculated by the same method as described above.

The correction data calculation unit 323D performs a process of calculating correction data for correcting the multispectral image on the basis of the amount of interference calculated by the interference amount calculation unit 323C.

Now, assuming that a correct multispectral image is denoted by X, a multispectral image including crosstalk is denoted by x, and a matrix in which both multispectral images are associated with each other is denoted by B, a relationship between the correct multispectral image X and the multispectral image x including crosstalk can be represented by the following expression.

$$x = BX$$

A matrix B is called a crosstalk matrix.

The crosstalk matrix B can be calculated from the interference matrix Ar in the real environment and the interference matrix As in the specific environment by the following expression.

$$B = As^{-1}Ar$$

That is, the crosstalk matrix B can be calculated by the product of the interference matrix Ar in the real environment and an inverse matrix $As^{-1}$ of the interference matrix As in the specific environment.

Here, the interference matrix As in the specific environment is calculated by uniformizing the spectral characteristics of the subject. For example, the interference matrix As is calculated in a state in which there is no slope of the spectral characteristics of the subject within the transmission wavelength range of each band-pass filter.

Figure 9:
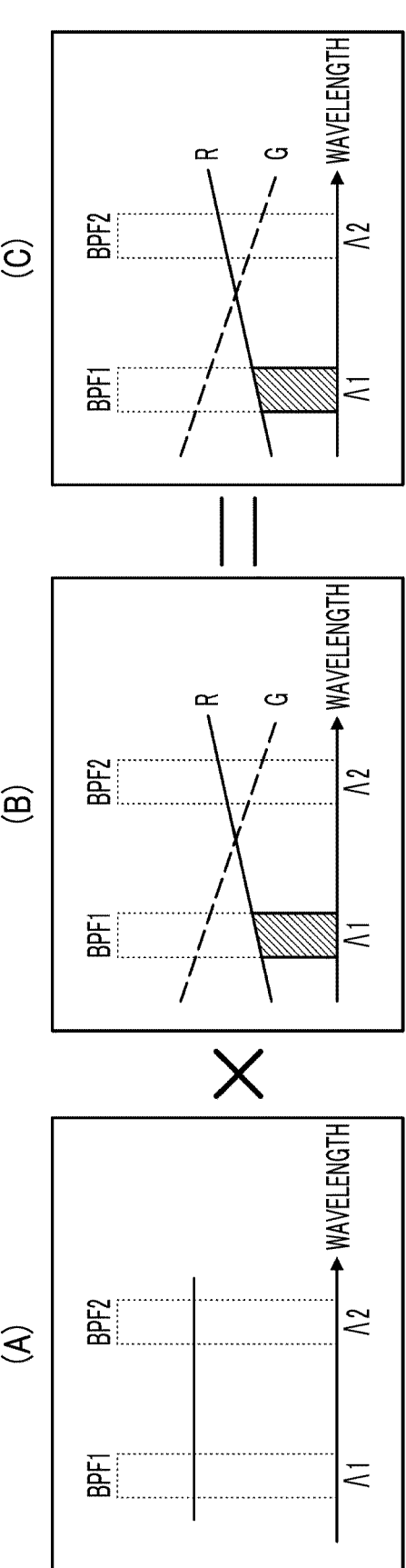
FIG. 9 is a conceptual diagram illustrating a process of calculating an interference matrix in a specific environment.

FIG. 9 is a conceptual diagram illustrating a process of calculating the interference matrix in the specific environment.

Here, for simplicity of description, an example of a case where the number of band-pass filters comprised in the lens device is 2 and the number of types of color filters (types of pixels) comprised in the image sensor is 2 will be described.

(A) of FIG. 9 illustrates the spectral characteristics of the subject. As illustrated in (A) of FIG. 9, the spectral characteristics of the subject are uniform in the specific environment. Therefore, the slopes of the spectral characteristics of the subject in the transmission wavelength ranges $\Lambda1$ and $\Lambda2$ of the band-pass filters BPF1 and BPF2 are zero. Further, (B) of FIG. 9 illustrates the spectral sensitivity characteristics of the R pixel and the G pixel of the image sensor. An integrated value (sensor response) of the spectral sensitivity of the subject and the spectral sensitivity of the image sensor in the transmission wavelength ranges $\Lambda1$ and $\Lambda2$ of the band-pass filters BPF1 and BPF2 is calculated ((C) of FIG. 9). The calculated value is the amount of interference in the specific environment.

It is assumed that an output value of the R pixel with respect to the light of the band-pass filter BPF1 is denoted by $As_{1R}$, an output value of the R pixel with respect to the light of the band-pass filter BPF2 is denoted by $As_{2R}$, an output value of the G pixel with respect to the light of the band-pass filter BPF1 is denoted by $As_{1G}$, and an output value of the G pixel with respect to the light of the band-pass filter BPF2 is $As_{2G}$. In a case where the number of band-pass filters comprised in the lens device is 2 and the number of types of color filters comprised in the image sensor is 2, the amount of light in each of the band-pass filters BPF1 and BPF2 and the output value of each of the pixels R and G of the image sensor are associated with one another at four values. The amounts of interference $As_{1R}$, $As_{2R}$, $As_{1G}$, and $As_{2G}$ in the specific environment are represented in the form of a matrix, and this matrix is the interference matrix As in the specific environment. An inverse matrix $As^{-1}$ of the interference matrix As is the interference removal matrix in the specific environment. As described above, the interference removal matrix $As^{-1}$ is calculated in advance and stored in the auxiliary storage device 314. In this embodiment, the interference matrix As is an example of a second matrix.

The interference matrix As in the specific environment is different from the interference matrix Ar in the real environment. Therefore, in a case where the interference removal process is performed on the image data (RAW image data) captured in the real environment using the interference removal matrix $As^{-1}$ calculated in the specific environment, the image of each band-pass filter is mixed with components of the images of other band-pass filters. That is, crosstalk occurs.

The correction data calculation unit 323D calculates the crosstalk matrix B from the interference matrix Ar in the real environment and the interference removal matrix $As^{-1}$ (the inverse matrix of the interference matrix As) in the specific environment.

Here, as described above, the correct multispectral image X and the multispectral image x including crosstalk can be represented by x=BX.

Therefore, the correct multispectral image X is calculated by multiplying the multispectral image x, in which crosstalk has occurred, by the inverse matrix $B^{-1}$ of the crosstalk matrix B. That is, the correct multispectral image X is calculated by $X=B^{-1}x$.

Therefore, the correction data calculation unit 323D calculates the inverse matrix $B^{-1}$ of the crosstalk matrix B to calculate the data for image correction.

In this embodiment, the inverse matrix $B^{-1}$ of the crosstalk matrix B is an example of first data. In addition, the image data (RAW image data) used to calculate the interference matrix As in the specific environment is an example of first image data. This image data (RAW image data) is image data obtained by uniformizing the spectral characteristics of the subject.

Further, the image data (RAW image data) used to calculate the interference matrix Ar in the real environment is an example of second image data, and the multispectral image generated from the second image data is an example of third image data. These image data items are image data including crosstalk. Further, in a case where the interference matrix Ar in the real environment is calculated, the spectral characteristics of the subject within the transmission wavelength range of each band-pass filter estimated from the multispectral image (third image data) is an example of a second feature amount. Furthermore, the slope of the spectral characteristics of the subject within the transmission wavelength range of each band-pass filter estimated from the spectral characteristics (second feature amount) of the subject is an example of second information of the spectral characteristic of the subject.

(3) Functions of Image Correction Unit

The image correction unit 322 acquires the data for image correction generated by the correction data generation unit 323 and corrects the multispectral image x generated by the image generation unit 321 using the acquired data. Specifically, the multispectral image x generated by the image generation unit 321 is multiplied by the inverse matrix $B^{-1}$ of the crosstalk matrix B to be corrected into the correct multispectral image X.

[Operation of Multispectral Camera System]

As described above, in the multispectral camera system 1 according to this embodiment, the interference removal process is performed on the image data (RAW image data) obtained by imaging, using the interference removal matrix calculated in the specific environment, and the multispectral image generated by the interference removal process is corrected to acquire a correct multispectral image.

[Generation of Correction Data]

First, the generation of the correction data used to correct the multispectral image will be described.

Figure 10:
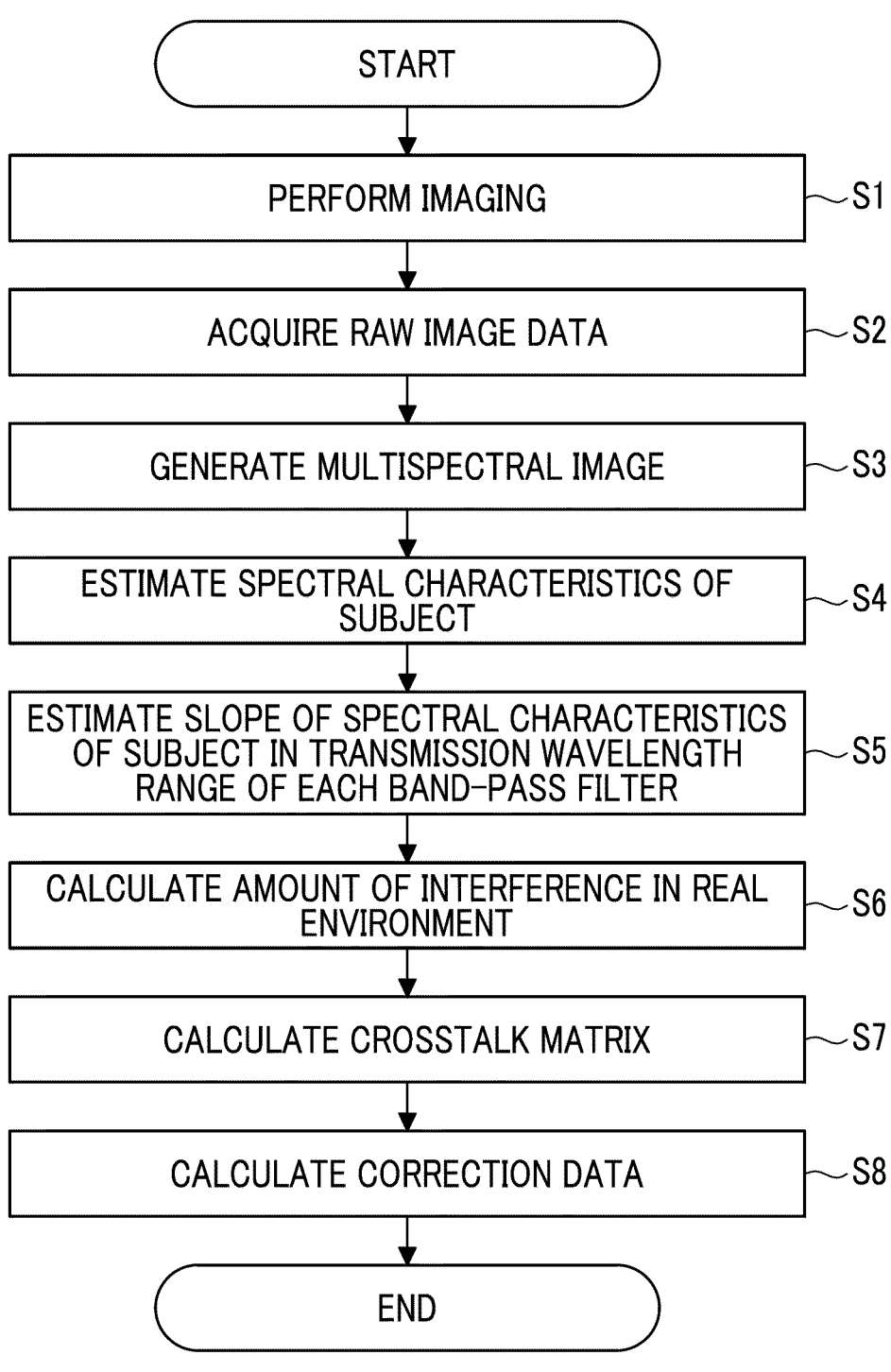
FIG. 10 is a flowchart illustrating a procedure of a process of generating correction data.

FIG. 10 is a flowchart illustrating a procedure of a process of generating the correction data.

First, in the real environment, the subject that is an object to be imaged is imaged (Step S1), and image data (RAW image data) of the subject is acquired (Step S2). The acquired image data (RAW image data) is an example of the second image data.

Then, the interference removal process is performed on the acquired RAW image data to generate a multispectral image (Step S3). The generated multispectral image is an example of the third image data.

Then, the spectral characteristics of the subject are estimated using the generated multispectral image (Step S4). For example, in this embodiment, the intensity of the image of each wavelength range is plotted, and curve fitting is performed to estimate the spectral characteristics of the imaged subject (see FIG. 6). The estimated spectral characteristics are an example of the feature amount.

Then, the slope of the spectral characteristics of the subject within the transmission wavelength range of each band-pass filter is estimated on the basis of the estimated spectral characteristics of the subject (Step S5). The estimated slope is an example of information.

Then, the amount of interference (the amount of crosstalk) in the real environment is calculated on the basis of the estimated slope and the information of the spectral sensitivity characteristics of each pixel of the image sensor (Step S6). The amount of interference in the real environment is calculated to calculate the interference matrix in the real environment.

Then, the crosstalk matrix is calculated on the basis of the calculated interference matrix in the real environment and the interference removal matrix calculated in the specific environment (Step S7). Specifically, the product of the interference matrix in the real environment and the interference removal matrix calculated in the specific environment is calculated to calculate the crosstalk matrix.

Then, the correction data is calculated on the basis of the calculated crosstalk matrix (Step S8). Specifically, the inverse matrix of the crosstalk matrix is calculated to calculate the correction data. The calculated correction data is an example of the first data.

[Generation of Multispectral Image]

Next, the generation (image data processing method) of the multispectral image using the multispectral camera system 1 according to this embodiment will be described.

Figure 11:
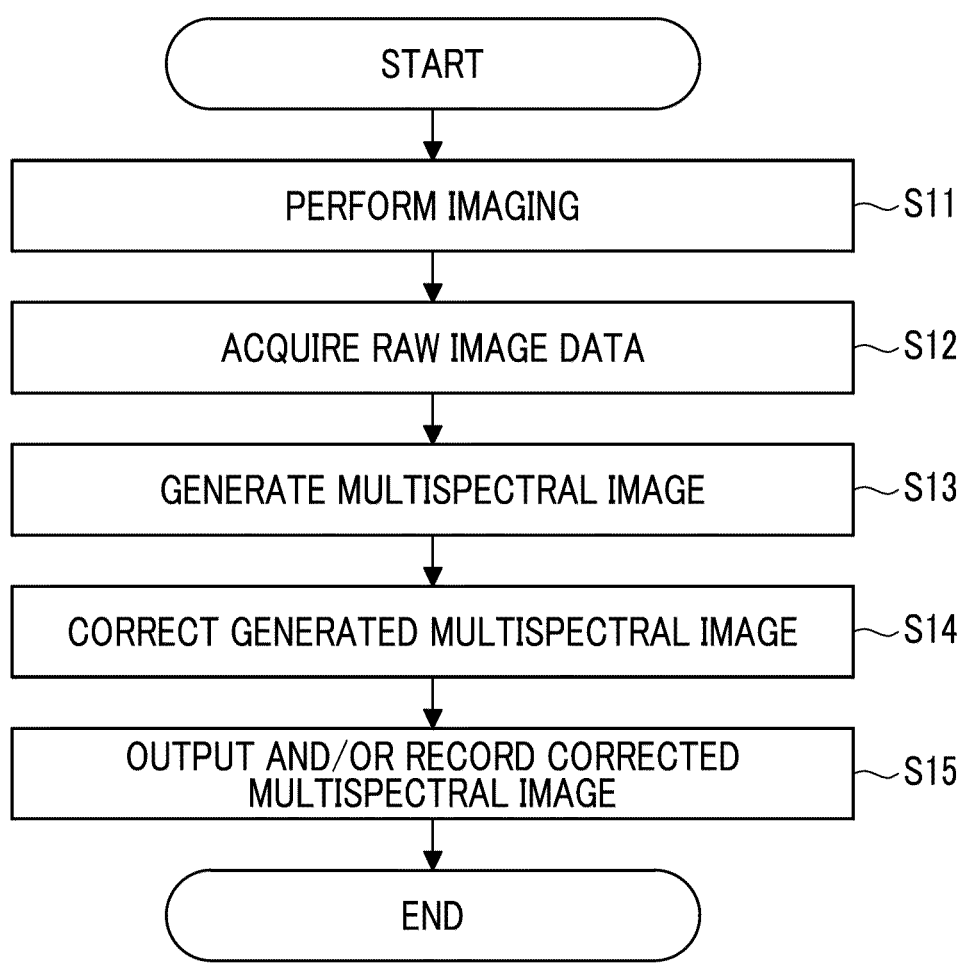
FIG. 11 is a flowchart illustrating a procedure of a process of generating the multispectral image.

FIG. 11 is a flowchart illustrating a procedure of a process of generating the multispectral image.

First, in the real environment, the subject is imaged (Step S11). Image data (RAW image data) of the subject is acquired by imaging (Step S12). The acquired image data is an example of the second image data.

Then, the interference removal process is performed on the acquired RAW image data to generate a multispectral image (Step S13). Here, the interference removal process is performed using the interference removal matrix calculated in the specific environment. Therefore, the generated multispectral image includes crosstalk. The generated multispectral image is an example of the third image data.

Then, the generated multispectral image is corrected (Step S14). The correction is performed using the correction data. The correction data is the inverse matrix of the crosstalk matrix. The correction is performed by applying the inverse matrix of the crosstalk matrix to the generated multispectral image. A crosstalk component is removed and a correct multispectral image is obtained by this correction.

The corrected multispectral image is output to the output device 316 and/or is recorded on the auxiliary storage device 314 (Step S15).

As described above, according to the multispectral camera system 1 of this embodiment, the correct multispectral image can be generated in imaging in the real environment. That is, it is possible to generate a high-quality multispectral image.

Examples

Here, a specific example of a case where a three-wavelength (three-band) multispectral image is captured will be described.

In a case where the three-wavelength multispectral image is captured, the lens device comprises three band-pass filters.

In addition, for simplicity of description, it is assumed that, in the image sensor, one pixel block is composed of three pixels (for example, an R pixel, a G pixel, and a B pixel). In this case, the interference removal matrix is configured as a matrix of three rows and three columns.

It is assumed that the interference removal matrix $As^{-1}$ in the specific environment is given as follows.

$$As^{-1} = \begin{bmatrix} 0.8 & 0.2 & 0.5 \\ 0.4 & 0.8 & 0.4 \\ 0.2 & 0.2 & 0.8 \end{bmatrix}$$

Further, it is assumed that the output (output value of each pixel in one pixel block) y of the image sensor is given as follows.

$$y = \begin{bmatrix} 2.48 \\ 2.86 \\ 2.51 \end{bmatrix}$$

In this case, the following values are obtained as the values of the corresponding pixels of the multispectral image x.

$$x = \begin{bmatrix} 3.811 \\ 4.284 \\ 3.076 \end{bmatrix}$$

Here, it is assumed that the interference removal matrix $Ar^{-1}$ in the real environment is given as follows.

$$Ar^{-1} = \begin{bmatrix} 0.9 & 0.4 & 0.2 \\ 0.1 & 0.8 & 0.1 \\ 0.1 & 0.3 & 0.9 \end{bmatrix}$$

The values of the corresponding pixels of the correct multispectral image X are the following values.

$$X = \begin{bmatrix} 3.878 \\ 2.787 \\ 3.365 \end{bmatrix}$$

The crosstalk matrix B can be calculated from the interference removal matrix $As^{-1}$ in the specific environment and the interference matrix Ar in the real environment.

In an ideal state, it is assumed that the matrix $As^{-1}$ and the matrix Ar calculated from the spectral characteristics of the subject and the spectral sensitivity of the image sensor are matched with the actual matrix $As^{-1}$ and the actual matrix Ar, respectively. In this case, the relationship of the following expression is established.

$$B = As^{-1}Ar = \begin{bmatrix} 0.8826 & -0.3402 & 0.3972 \\ 0.3316 & 0.7254 & 0.2902 \\ 0.1416 & -0.1485 & 0.8739 \end{bmatrix}$$

In a case where the inverse matrix $B^{-1}$ of the crosstalk matrix B is applied to the multispectral image x, the following values are obtained.

$$B^{-1}x = \begin{bmatrix} 3.878 \\ 2.787 \\ 3.365 \end{bmatrix}$$

This value is matched with the value of the correct multispectral image X. That is, the inverse matrix $Ar^{-1}$ of the interference matrix Ar in the real environment is estimated from the information of the spectral characteristics of the subject within the transmission wavelength range of each band-pass filter to obtain the correct multispectral image X.

Modification Examples

[Method for Acquiring Information of Spectral Characteristics of Subject]

In the above-described embodiment, the spectral characteristics of the subject to be imaged are estimated from the multispectral image obtained by imaging. However, a method for acquiring the information of the spectral characteristics of the subject is not limited thereto. A configuration in which information measured by another device is acquired may be adopted. For example, a configuration can also be adopted in which the information of the spectral characteristics of the subject is acquired from a multispectral image captured by another multispectral camera (including a hyperspectral camera). Alternatively, a configuration can also be adopted in which information of the spectral characteristics of the subject measured by another spectrometer is acquired.

[Method for Estimating Spectral Characteristics of Subject]

In the above-described embodiment, the spectral characteristics of the subject is estimated by the so-called curve fitting method. However, the method for estimating the spectral characteristics of the subject is not limited thereto. In addition, for example, a method can also be adopted which connects plotted points indicating the intensity of the image of each wavelength range in a straight line to perform the estimation. Further, a method can also be adopted which connects plotted points indicating the intensity of the image of each wavelength range in a curved line using a polynomial, a spline, or the like to perform the estimation. Furthermore, for the curve fitting, for example, a least square method or the like can be adopted.

[Method for Calculating Information of Spectral Characteristics]

A method for calculating the information of the spectral characteristics of the subject within the transmission wavelength range of the band-pass filter is not limited to the method according to the above-described embodiment.

Figure 12:
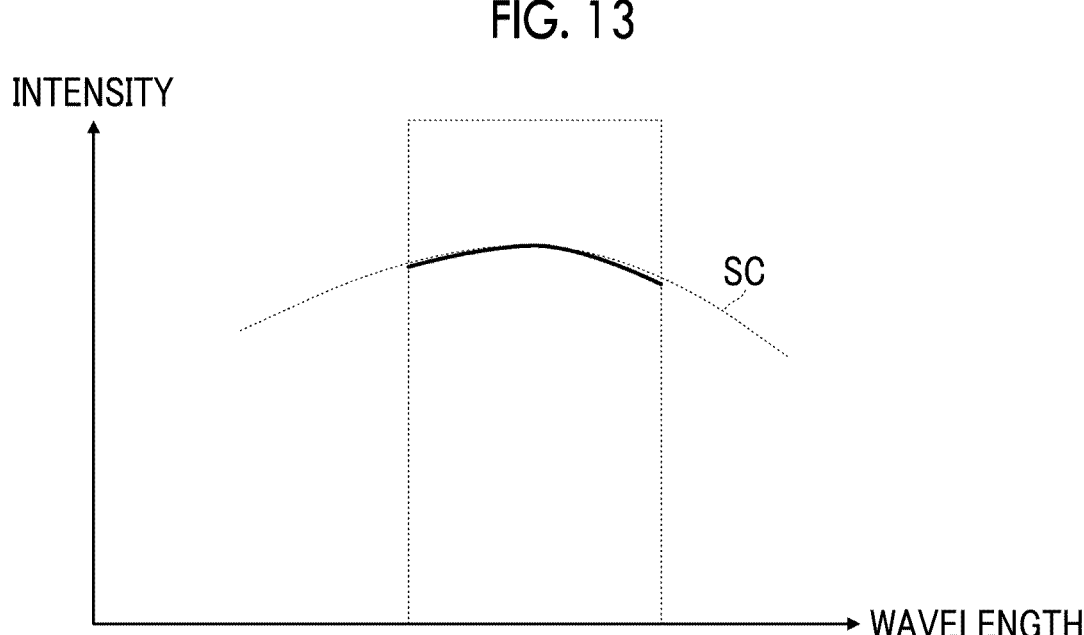
FIG. 12 is a diagram illustrating another example of a method for calculating a feature amount.

FIG. 12 is a diagram illustrating another example of the method for calculating the information of the spectral characteristics.

In FIG. 12, in the transmission wavelength range of the band-pass filter to be calculated, end points of the spectral characteristics of the subject are connected in a straight line to calculate a slope which is the information of the spectral characteristics.

FIG. 13 is a diagram illustrating still another example of the method for calculating the information of the spectral characteristics.

In FIG. 13, in the transmission wavelength range of the band-pass filter to be calculated, the information of the spectral characteristics is calculated using a high-order curve.

[Method for Calculating Interference Removal Matrix in Specific Environment]

In the above-described embodiment, the interference removal matrix in the specific environment is calculated by uniformizing the spectral characteristics of the subject. However, a method for calculating the interference removal matrix in the specific environment is not limited thereto. The present disclosure can be applied even in a case where the interference removal matrix is calculated in the specific environment assuming that the spectral characteristics of the subject have a known slope within the transmission wavelength range of the band-pass filter.

[Storage of Correction Data]

A configuration can also be adopted in which the correction data calculated by the correction data calculation unit 323D is stored in the auxiliary storage device 314. In this case, the auxiliary storage device 314 is an example of a memory.

Further, a configuration can also be adopted in which correction data for a plurality of subjects is calculated in advance, is stored in the auxiliary storage device 314, is read out as appropriate, and is then used.

Second Embodiment

In the first embodiment, the multispectral image including crosstalk is corrected to acquire the correct multispectral image. In this embodiment, the interference removal matrix is corrected to acquire the correct multispectral image.

In addition, configurations other than image processing are the same as those in the first embodiment. Therefore, here, only the image processing which is a difference will be described.

Figure 14:
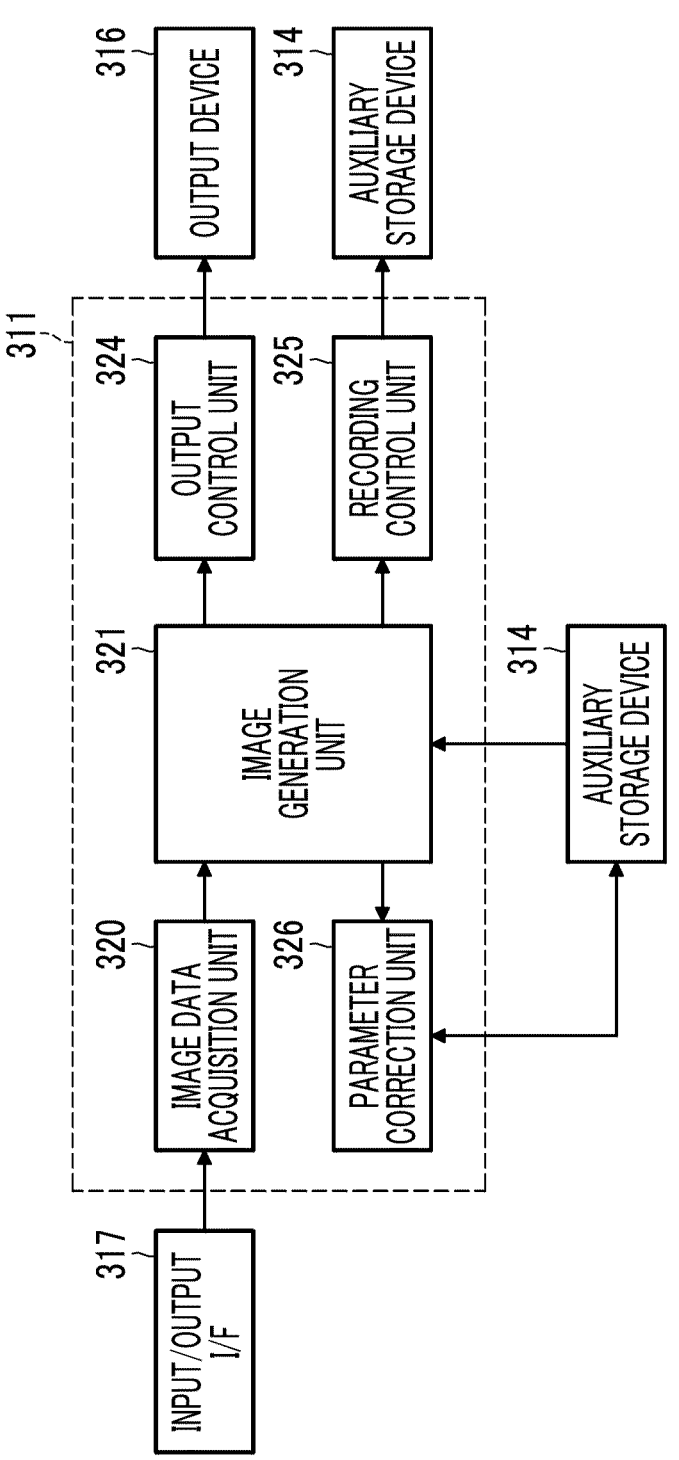
FIG. 14 is a block diagram illustrating main functions implemented by an image data processing device.

FIG. 14 is a block diagram illustrating main functions implemented by an image data processing device.

As illustrated in FIG. 14, an image data processing device 300 according to this embodiment has the functions of an image data acquisition unit 320, an image generation unit 321, an output control unit 324, a recording control unit 325, and a parameter correction unit 326. The CPU 311 executes a predetermined program (image data processing program) to implement each of the functions.

The main difference from the image data processing device 300 according to the first embodiment is that the parameter correction unit 326 is provided.

The parameter correction unit 326 performs a process of correcting the interference removal matrix calculated in the specific environment. That is, the parameter correction unit 326 performs a process of correcting elements (interference removal parameters) of the interference removal matrix. The correction is performed by multiplying the interference removal matrix $As^{-1}$ calculated in the specific environment by the inverse matrix $B^{-1}$ of the crosstalk matrix B. That is, the interference removal matrix $Ar^{-1}$ in the real environment is obtained by the following expression.

$$Ar^{-1} = B^{-1}As^{-1}$$

A method for acquiring the crosstalk matrix B and the inverse matrix $B^{-1}$ thereof is the same as that in the first embodiment. Therefore, a description thereof will be omitted. In this embodiment, the inverse matrix $B^{-1}$ of the crosstalk matrix B is an example of the first data.

The image generation unit 321 performs the interference removal process using the corrected interference removal matrix (the interference removal matrix $Ar^{-1}$ in the real environment) to generate a multispectral image.

[Process of Correcting Interference Removal Matrix]

FIG. 15 is a flowchart illustrating a procedure of a process of correcting the interference removal matrix.

First, in the real environment, the subject that is an object to be imaged is imaged (Step S21), and image data (RAW image data) is acquired (Step S22). The acquired image data is an example of the second image data.

Then, the interference removal process is performed on the acquired RAW image data to generate a multispectral image (Step S23). The generated multispectral image is an example of the third image data.

Then, the spectral characteristics of the subject are estimated using the generated multispectral image (Step S24). The estimated spectral characteristics of the subject are an example of the feature amount.

Then, the slope of the spectral characteristics of the subject within the transmission wavelength range of each band-pass filter is estimated on the basis of the estimated spectral characteristics of the subject (Step S25). The estimated slope is an example of the information.

Then, the amount of interference (the amount of crosstalk) in the real environment is calculated on the basis of the estimated slope and the information of the spectral sensitivity characteristics of each pixel of the image sensor (Step S26). The interference matrix Ar in the real environment is calculated by the calculation of the amount of interference in the real environment.

Then, the crosstalk matrix B is calculated on the basis of the calculated interference matrix Ar in the real environment and the interference removal matrix $As^{-1}$ calculated in the specific environment (Step S27).

Then, the inverse matrix $B^{-1}$ of the calculated crosstalk matrix B is calculated (Step S28). The calculated inverse matrix $B^{-1}$ is the correction data.

Then, the interference removal matrix $As^{-1}$ calculated in the specific environment is corrected using the calculated inverse matrix $B^{-1}$ (Step S29). Specifically, the interference removal matrix $As^{-1}$ calculated in the specific environment is multiplied by the calculated inverse matrix $B^{-1}$ to perform the correction.

The interference removal matrix $As^{-1}$ calculated in the specific environment is corrected by the above-described series of processes. Each element of the interference removal matrix $As^{-1}$ calculated in the specific environment is an example of the parameters used in the interference removal process.

[Generation of Multispectral Image]

Figure 16:
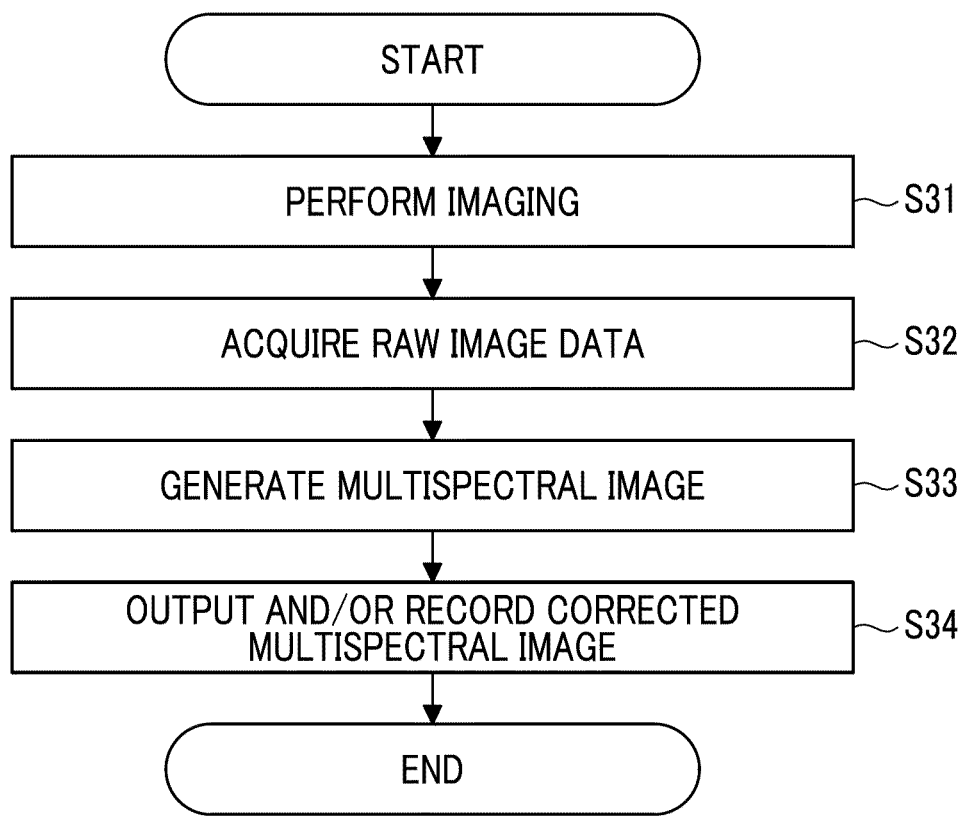
FIG. 16 is a flowchart illustrating a procedure of a process of generating a multispectral image.

FIG. 16 is a flowchart illustrating a procedure of a process of generating a multispectral image.

First, the subject is imaged in the real environment (Step S31). Image data (RAW image data) of the subject is acquired by imaging (Step S32).

Then, the interference removal process is performed on the acquired RAW image data to generate a multispectral image (Step S33). Here, the interference removal process is performed using the corrected interference removal matrix. As a result, a correct multispectral image is generated.

The generated multispectral image is output to the output device 316 and/or is recorded on the auxiliary storage device 314 (Step S34).

As described above, even in the multispectral camera system 1 according to this embodiment, a correct multispectral image can be acquired by imaging in the real environment. That is, it is possible to generate a high-quality multispectral image.

Examples

Here, a specific example of a case where a three-wavelength (three-band) multispectral image is captured will be described.

As described above, in a case where the three-wavelength multispectral image is captured, the lens device comprises three band-pass filters. In addition, for simplicity of description, it is assumed that, in the image sensor, one pixel block is composed of three pixels (for example, an R pixel, a G pixel, and a B pixel). In this case, the interference removal matrix is configured as a matrix of three rows and three columns.

It is assumed that the crosstalk matrix B is given as follows.

$$B = \begin{bmatrix} 0.8826 & -0.3402 & 0.3972 \\ 0.3316 & 0.7254 & 0.2902 \\ 0.1416 & -0.1485 & 0.8739 \end{bmatrix}$$

The interference removal matrix $As^{-1}$ calculated in the specific environment is corrected using the inverse matrix $B^{-1}$ of the crosstalk matrix B.

$$Ar^{-1} = B^{-1}As^{-1} = \begin{bmatrix} 0.9 & 0.4 & 0.2 \\ 0.1 & 0.8 & 0.1 \\ 0.1 & 0.3 & 0.9 \end{bmatrix}$$

The interference removal process is performed on the output of the image sensor using the corrected interference removal matrix $Ar^{-1}$.

$$Ar^{-1}y = \begin{bmatrix} 0.9 & 0.4 & 0.2 \\ 0.1 & 0.8 & 0.1 \\ 0.1 & 0.3 & 0.9 \end{bmatrix} \begin{bmatrix} 2.48 \\ 2.86 \\ 2.51 \end{bmatrix} = \begin{bmatrix} 3.878 \\ 2.787 \\ 3.365 \end{bmatrix}$$

The obtained value is matched with the value of the correct multispectral image X.

Modification Examples

[Storage of Correction Data]

The correction data (the inverse matrix $B^{-1}$ of the crosstalk matrix B) can also be stored in the auxiliary storage device 314.

Further, a configuration can also be adopted in which correction data for a plurality of subjects is calculated in advance, is stored in the auxiliary storage device 314, is read out as appropriate, and is then used.

In addition, a configuration can also be adopted in which the corrected interference removal matrix is stored in the auxiliary storage device 314, instead of storing the correction data in the auxiliary storage device 314.

[Update of Interference Removal Matrix]

A configuration can also be adopted in which the interference removal matrix used in the interference removal process is updated at any time by correction. In this case, the corrected interference removal matrix is further corrected.

[Others]

For example, the method for calculating the information of the spectral characteristics described as the modification example of the first embodiment can also be applied to this embodiment.

Third Embodiment

In this embodiment, image data (RAW image data) obtained by imaging is corrected to acquire a correct multispectral image.

In addition, configurations other than image processing are the same as those in the first or second embodiment. Therefore, here, only the image processing which is a difference will be described.

Figure 17:
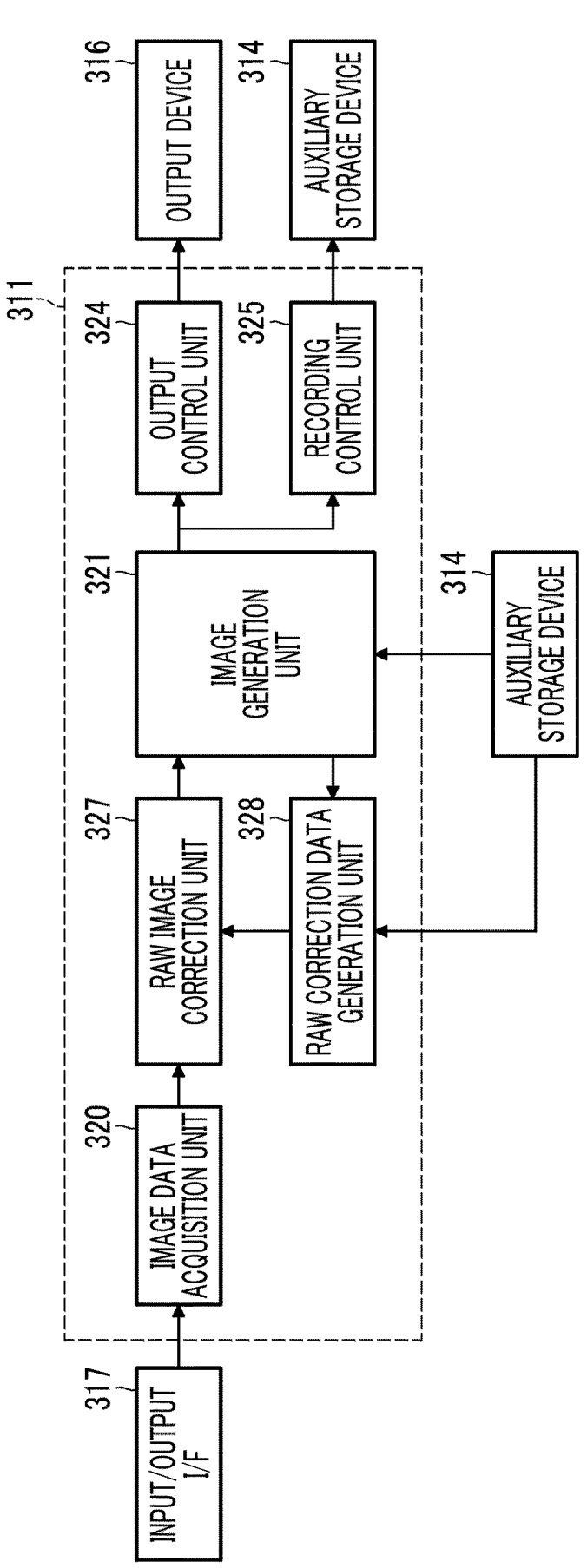
FIG. 17 is a block diagram illustrating main functions implemented by an image data processing device.

FIG. 17 is a block diagram illustrating main functions implemented by an image data processing device.

As illustrated in FIG. 17, an image data processing device 300 according this embodiment has functions of an image data acquisition unit 320, an image generation unit 321, an output control unit 324, a recording control unit 325, a RAW image correction unit 327, and a RAW correction data generation unit 328. The CPU 311 executes a predetermined program (image data processing program) to implement each of the functions.

The main difference from the image data processing devices 300 according to the first and second embodiments is that the RAW image correction unit 327 and the RAW correction data generation unit 328 are provided.

The RAW image correction unit 327 performs a process of correcting the image data (RAW image data) acquired by the image data acquisition unit 320.

The RAW correction data generation unit 328 performs a process of generating correction data to be used in the RAW image correction unit 327.

Here, assuming that a pixel value of each pixel in one pixel block in the RAW image data is denoted by y (y1, y2, . . . ) and a signal value of one pixel block in the corrected RAW image data is denoted by Y (Y1, Y2, . . . ), in this embodiment, the RAW image correction unit 327 corrects the RAW image data using the following expression.

$$Y = y - C\alpha$$

Therefore, in this embodiment, the RAW correction data generation unit 328 generates $C\alpha$ as the correction data.

In addition, corrected RAW image data Y is image data with which a correct multispectral image is obtained in a case where the interference removal process is performed using the interference removal matrix calculated in the specific environment.

The correction data $C\alpha$ is calculated using the slope of the spectral characteristics of the subject within the transmission wavelength range of each band-pass filter. Specifically, the correction data $C\alpha$ is calculated as follows.

It is assumed that the spectral sensitivity of an i-th pixel constituting the pixel block of the image sensor is $hi(\lambda)$. In addition, it is assumed that transmission characteristics of a j-th band-pass filter comprised in the lens device are $gj(\lambda)$.

The following expression is calculated, and it is assumed that a matrix having the calculated value as an element in an i-th row and a j-th column is C.

$$Cij = \int hi(\lambda)gj(\lambda)(\lambda - \lambda j)d\lambda$$

Here, $\lambda$ is a wavelength, and $\lambda j$ is a center wavelength of the transmission wavelength range of the j-th band-pass filter.

It is assumed that a vector in which the slopes of the spectral characteristics of the subject within the transmission wavelength range of each band-pass filter are arranged is $\alpha$.

It is assumed that data obtained by multiplying the matrix C by the vector $\alpha$ is the correction data $C\alpha$.

Figure 18:
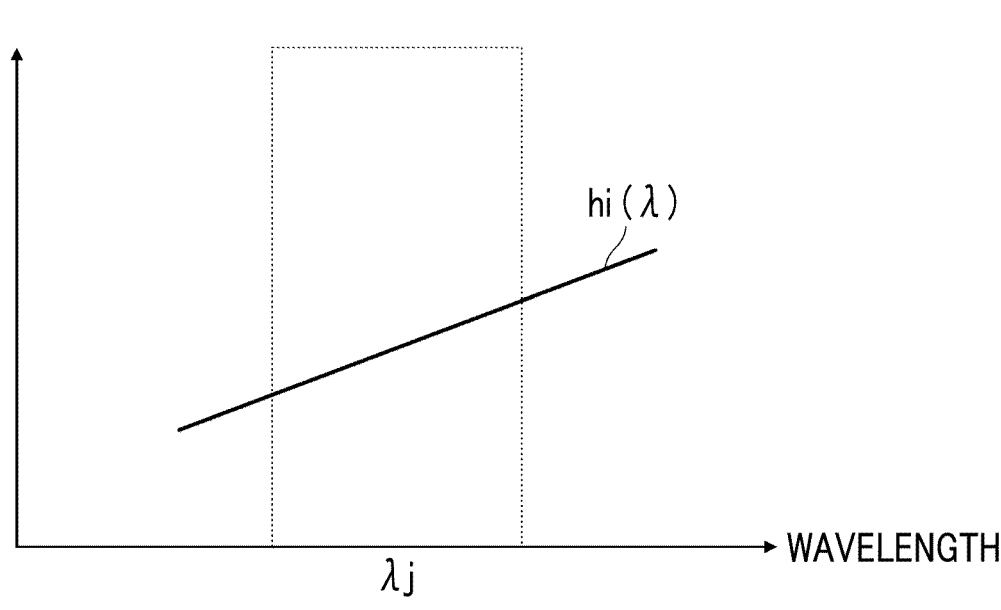
FIG. 18 is a diagram illustrating a specific example of a method for calculating elements Cij of a matrix C.
Figure 19:
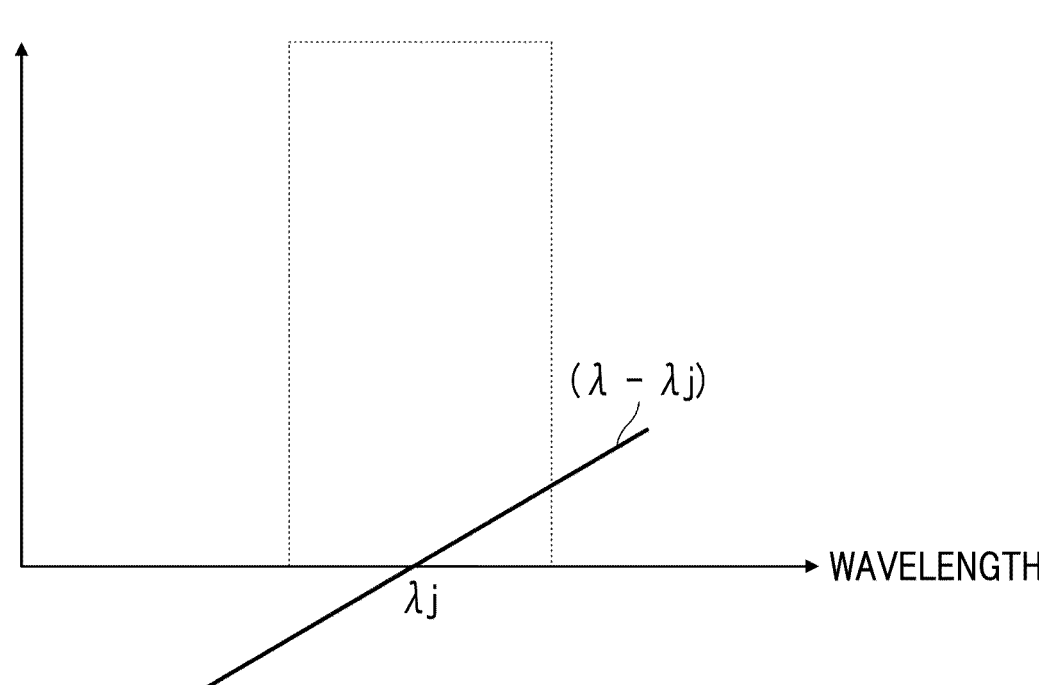
FIG. 19 is a diagram illustrating the specific example of the method for calculating the elements Cij of the matrix C.

FIGS. 18 and 19 are diagrams illustrating a specific example of a method for calculating elements Cij of the matrix C.

Assuming that the transmission characteristics of the j-th band-pass filter are $gj(\lambda)=1$, the spectral sensitivity of the i-th pixel is linear, and $hi(\lambda)=a\lambda+b$ is established, a graph illustrated in FIG. 18 is obtained.

A graph illustrated in FIG. 19 is obtained by the following expression. Specifically, Cij can be calculated.

$$Cij = \int hi(\lambda)gj(\lambda)(\lambda - \lambda j)d\lambda = \int (a\lambda + b)(\lambda - \lambda j)d\lambda$$

Information of the spectral sensitivity $hi(\lambda)$ of each pixel and information of the transmission characteristics $gj(\lambda)$ of each band-pass filter are stored in the auxiliary storage device 314 in advance.

The RAW correction data generation unit 328 estimates the slope of the spectral characteristics of the subject within the transmission wavelength range of each band-pass filter from the multispectral image obtained by imaging. Then, the correction data Cα is calculated from the estimated slope, the information of the spectral sensitivity hi(λ) of each pixel, and the information of the transmission characteristics gj(λ) of each band-pass filter. In this embodiment, the correction data Cα is an example of the first data.

The RAW image correction unit 327 acquires the correction data Cα generated by the RAW correction data generation unit 328 and corrects the RAW image data using Y=y–Cα.

The image generation unit 321 performs the interference removal process on the corrected RAW image data using the interference removal matrix calculated in the specific environment to generate a multispectral image.

[Generation of Correction Data]

Figure 20:
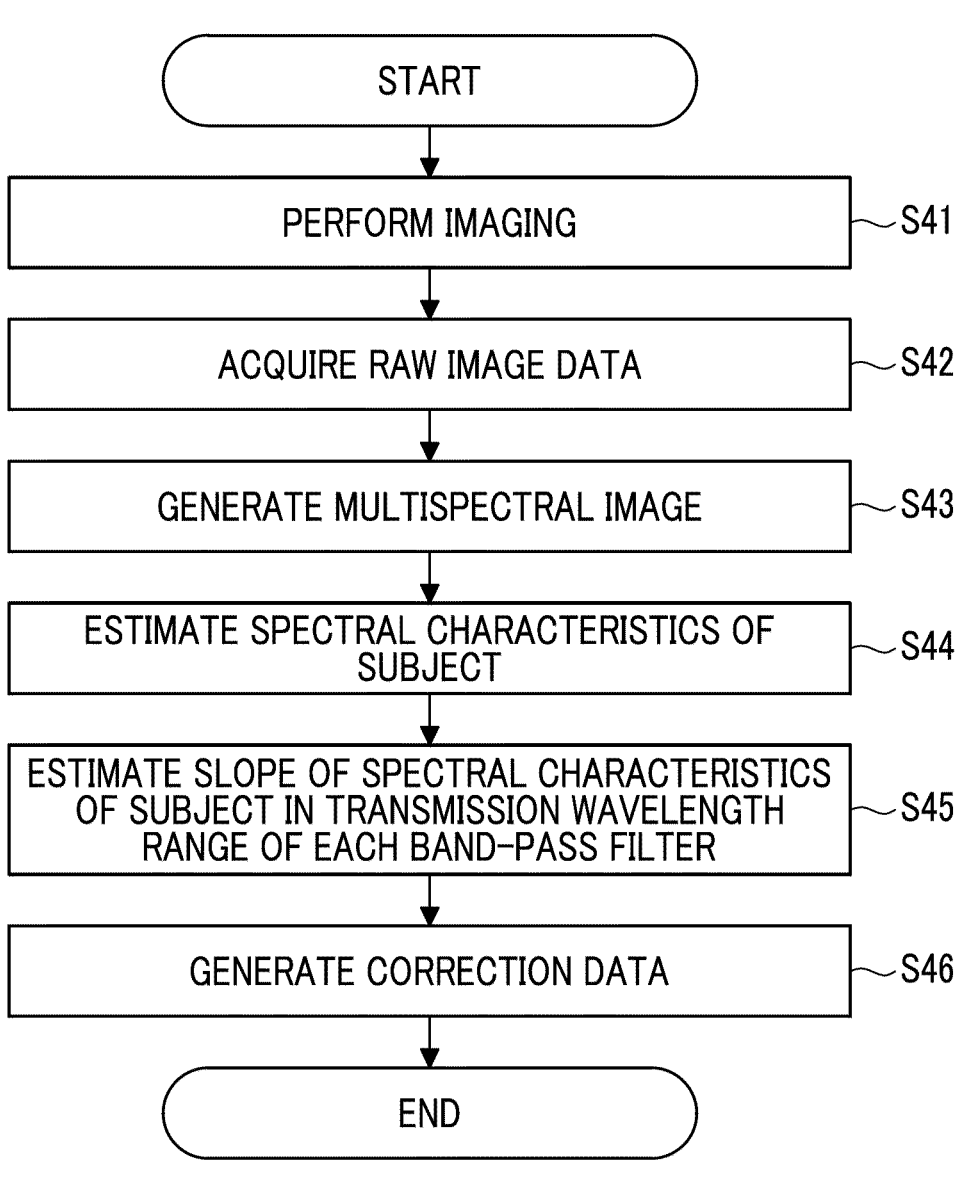
FIG. 20 is a flowchart illustrating a procedure of a process of generating correction data.

FIG. 20 is a flowchart illustrating a procedure of a process of generating the correction data.

First, in the real environment, the subject that is an object to be imaged is imaged (Step S41), and image data (RAW image data) is acquired (Step S42).

Then, the interference removal process is performed on the acquired RAW image data to generate a multispectral image (Step S43).

Then, the spectral characteristics of the subject are estimated using the generated multispectral image (Step S44).

Then, the slope of the spectral characteristics of the subject within the transmission wavelength range of each band-pass filter is estimated on the basis of the estimated spectral characteristics of the subject (Step S45).

The correction data Cα is generated from the estimated slope, the information of the spectral sensitivity hi(λ) of each pixel, and the information of the transmission characteristics gj(λ) of each band-pass filter. Specifically, Cij is calculated on the basis of the information of the spectral sensitivity hi(λ) of each pixel and the information of the transmission characteristics gj(λ) of each band-pass filter to generate the matrix C. In addition, the vector α is generated from the estimated slope. The matrix C is multiplied by the generated vector α to generate the correction data Cα.

[Generation of Multispectral Image]

Figure 21:
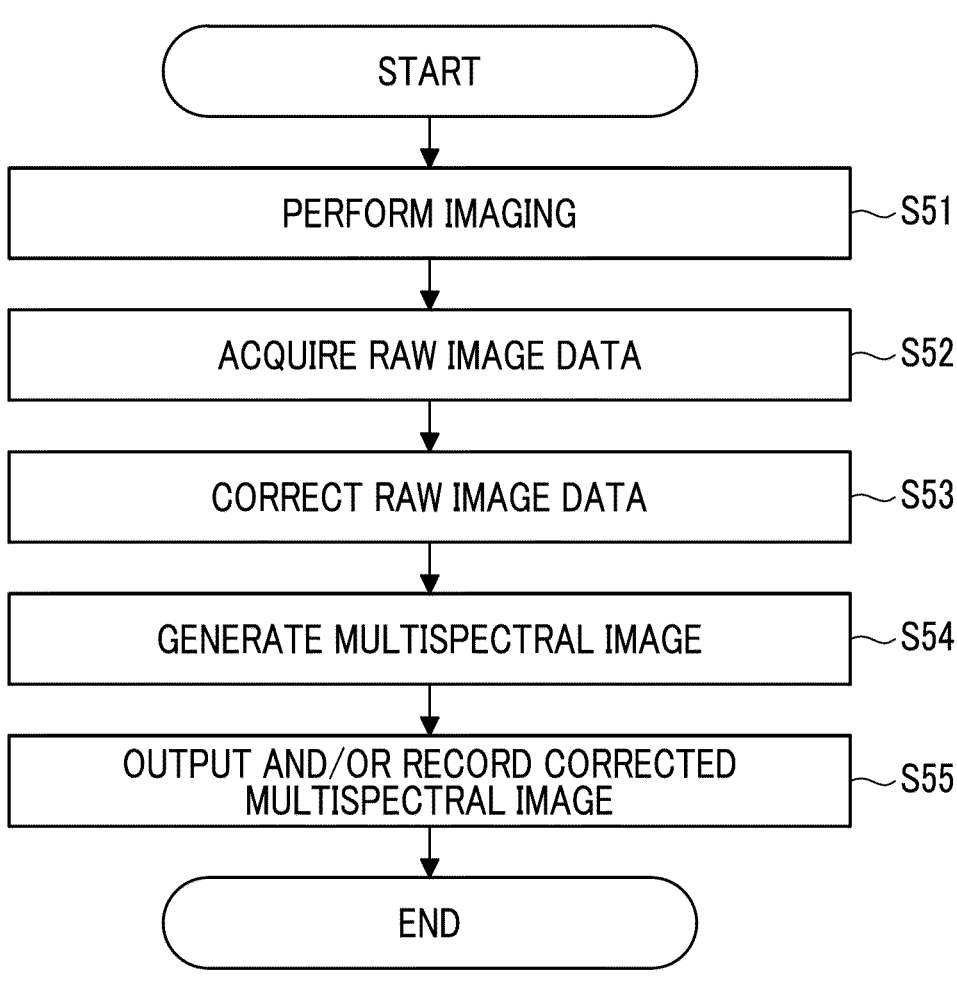
FIG. 21 is a flowchart illustrating a procedure of a process of generating a multispectral image.

FIG. 21 is a flowchart illustrating a procedure of a process of generating a multispectral image.

First, the subject is imaged in the real environment (Step S51). Image data (RAW image data) of the subject is acquired by imaging (Step S52). The acquired image data (RAW image data) is an example of the second image data.

Then, the acquired RAW image data is corrected using the correction data (Step S53). That is, the RAW image data is corrected by Y=y–Cα.

Then, the interference removal process is performed on the corrected RAW image data to generate a multispectral image (Step S54). Here, the interference removal process is performed using the interference removal matrix calculated in the specific environment. However, since the RAW image data is corrected, a correct multispectral image can be obtained.

The generated multispectral image is output to the output device 316 and/or is recorded on the auxiliary storage device 314 (Step S55).

As described above, even in the multispectral camera system 1 according to this embodiment, a correct multispectral image can be acquired by imaging in the real environment. That is, it is possible to generate a high-quality multispectral image.

Modification Examples

Since the spectral sensitivity hi(λ) of each pixel and the transmission characteristics gj(λ) of each band-pass filter are known, the matrix C may be calculated in advance and stored in the auxiliary storage device 314 or the like.

Further, for the vector α, information of the slope may be calculated in advance for a plurality of subjects and stored in the auxiliary storage device 314 or the like.

[Others]

For example, the method for calculating the information of the spectral characteristics described as the modification example of the first embodiment can also be applied to this embodiment.

Other Embodiments

[Polarization-Type Multispectral Camera System]

The present invention can also be applied to a polarization-type multispectral camera system. The polarization-type multispectral camera system is a multispectral camera system using polarization. In the polarization-type multispectral camera system, a polarization filter is provided in a lens device, and a polarizer is provided in an image sensor. The polarizer is another example of the optical filter. The polarization filter of the lens device is comprised in each opening portion of the filter unit. The polarizer of the image sensor is comprised in each pixel. The interference removal matrix is set in consideration of interference caused by polarization. In addition, since the polarization-type multispectral camera system is known, a detailed description thereof will be omitted (see, for example, WO2020/075523A, WO2020/250773A, and the like).

Further, the polarization type also includes a polarized color type. The polarized color type is one of the polarization-type multispectral camera systems, in which an image sensor is provided with a polarizer and a color filter.

Furthermore, the color filters provided in the image sensor also include a filter which transmits light other than light in a visible light range. For example, the color filters also include a filter (so-called infrared filter) that transmits light in an infrared range.

[Pixel Block]

The pixel block is appropriately set depending on a color filter array or the like of the image sensor to be used. For example, in a Bayer-array color image sensor, an R pixel, a Gr pixel adjacent to the R pixel (a G pixel in the same row as the R pixel), a B pixel, and a Gb pixel adjacent to the B pixel (a G pixel in the same row as the B pixel) are used as one set and constitutes one pixel block.

In addition, in a case where four pixels constitute one pixel block and a three-wavelength (three-band) multispectral image is generated, the outputs of all of the pixels are not necessarily used. For example, a configuration can also be adopted in which a multispectral image is generated using the outputs of three pixels of the R pixel, the B pixel, and the Gr pixel (or the Gb pixel).

[Multispectral Camera]

The multispectral camera may have a configuration in which the lens device is interchangeable with respect to the camera body.

Further, the lens device can have a configuration in which the filter unit is interchangeable. Furthermore, a configuration can also be adopted in which the band-pass filter mounted on each opening portion of the filter unit is interchangeable. This makes it possible to generate a multispectral image of any combinations of wavelengths.

Moreover, in a case where the band-pass filter mounted on each opening portion of the filter unit is interchangeable, all of the opening portions are not necessarily used. For example, in a case where the filter frame comprises four opening portions and a three-wavelength multispectral image is captured, one opening portion can be used to shield light.

Modification Example of Image Data Processing Device

In the multispectral camera systems according to the above-described embodiments, the multispectral camera and the image data processing device are separately configured. However, the camera body of the multispectral camera may have the functions of the image data processing device.

In addition, the functions implemented by the image data processing device are implemented by various processors. The various processors include, for example, a CPU and/or a graphic processing unit (GPU) as a general-purpose processor executing a program to function as various processing units, a programmable logic device (PLD), such as a field programmable gate array (FPGA), which is a processor whose circuit configuration can be changed after manufacture, and a dedicated electric circuit, such as an application specific integrated circuit (ASIC), which is a processor having a dedicated circuit configuration designed to perform a specific process. The program is synonymous with software.

One processing unit may be configured by one of the various processors or by a combination of two or more processors of the same type or different types. For example, one processing unit may be configured by a combination of a plurality of FPGAs or a combination of a CPU and an FPGA. In addition, a plurality of processing units may be configured by one processor. A first example in which the plurality of processing units are configured by one processor is an aspect in which one processor is configured by a combination of one or more CPUs and software and functions as a plurality of processing units. A representative example of this aspect is a client computer or a server computer. A second example of the configuration is an aspect in which a processor that implements the functions of the entire system including a plurality of processing units using one integrated circuit (IC) chip is used. A representative example of this aspect is a system-on-chip (SoC). As described above, various processing units are configured using one or more of the various processors as a hardware structure.

EXPLANATION OF REFERENCES

1: multispectral camera system
10: multispectral camera
100: lens device
110A: lens group
110B: lens group
120: filter unit
122: filter frame
122A: opening portion (first opening portion)
122B: opening portion (second opening portion)
122C: opening portion (third opening portion)
123A: band-pass filter (first band-pass filter)
123B: band-pass filter (second band-pass filter)
123C: band-pass filter (third band-pass filter)
200: camera body
210: image sensor 300: image data processing device
311: CPU
312: ROM
313: RAM
314: auxiliary storage device
315: input device
316: output device
317: input/output interface
320: image data acquisition unit
321: image generation unit
322: image correction unit
323: correction data generation unit
323A: spectral characteristic estimation unit
323B: slope estimation unit
323C: interference amount calculation unit
323D: correction data calculation unit
324: output control unit
325: recording control unit
326: parameter correction unit
327: RAW image correction unit
328: RAW correction data generation unit
S1 to S8: procedure of process of generating correction data
S11 to S15: procedure of process of generating multispectral image
S21 to S28: procedure of process of correcting interference removal matrix
S31 to S34: procedure of process of generating multispectral image
S41 to S45: procedure of process of generating correction data
S51 to S55: procedure of process of generating multispectral image

What is claimed is:

1. An image data processing device for processing image data obtained by imaging light of a subject, which has been spectrally separated into a plurality of wavelengths through a band-pass filter, with an image sensor, the image data processing device comprising:

a processor,
wherein the processor is configured to:
acquire as first image data, which is image data obtained by imaging light of the subject under an imaging condition in which a specific environment in which influence of disturbance light is suppressed;
calculate a feature amount in a transmission wavelength range of the band-pass filter on the basis of the first image data; and
calculate information of spectral characteristics of the subject on the basis of the feature amount.

2. The image data processing device according to claim 1, wherein the image sensor is an image sensor that is provided with a plurality of types of optical filters.

3. The image data processing device according to claim 2, wherein the spectral characteristics are calculated by converting the feature amount into a function.

4. The image data processing device according to claim 2, wherein the information is information based on a differential value of the spectral characteristics.

5. The image data processing device according to claim 1, wherein the spectral characteristics of the subject in the transmission wavelength range of the band-pass filter in the first image data are uniform.

6. The image data processing device according to claim 2, wherein the processor is configured to:

acquire as second image data, image data obtained by imaging light of the subject under another imaging condition in which an environment different from the specific environment;

perform an image generation process on the second image data to acquire third image data of the plurality of wavelengths;

calculate a second feature amount in the transmission wavelength range of the band-pass filter on the basis of the third image data;

calculate second information of the spectral characteristics of the subject on the basis of the second feature amount; and calculate first data on the basis of the information and the second information.

7. The image data processing device according to claim 6, wherein the image generation process is an interference removal process on the second image data.

8. The image data processing device according to claim 6, wherein, in the image generation process, a pixel value corresponding to a specific wavelength range among transmission wavelength ranges of a plurality of the band-pass filters is extracted from the second image data to generate the third image data.

9. The image data processing device according to claim 6, wherein the processor is configured to:

correct the third image data using the first data.

10. The image data processing device according to claim 9, wherein the processor is configured to:

calculate an amount of interference on the basis of the information and spectral sensitivity characteristics of the image sensor; and calculate the first data on the basis of the calculated amount of interference.

11. The image data processing device according to claim 10, wherein the processor is configured to:

calculate an output value of a pixel of each of the plurality of types of optical filters with respect to light of each of the band-pass filters, on the basis of the information and the spectral sensitivity characteristics of the image sensor; and calculate, as the amount of interference, a first matrix having the calculated output value as an element.

12. The image data processing device according to claim 11, wherein the processor is configured to:

calculate the output value of the pixel of each of the optical filters with respect to the light of each of the band-pass filters on the basis of the spectral characteristics of the subject used in a case where a parameter used in the image generation process is calculated and the spectral sensitivity characteristics of the image sensor;

calculate a second matrix having the calculated output value as an element; and generate the first data on the basis of the first matrix and the second matrix.

13. The image data processing device according to claim 7, wherein the processor is configured to:

correct a parameter used in the interference removal process, using the first data.

14. The image data processing device according to claim 13, wherein an amount of interference is calculated on the basis of the information and spectral sensitivity characteristics of the image sensor, and the first data is calculated on the basis of the amount of interference.

15. The image data processing device according to claim 14, wherein the processor is configured to:

calculate an output value of a pixel of each of the optical filters with respect to light of each of the band-pass filters, on the basis of the information and the spectral sensitivity characteristics of the image sensor; and calculate, as the amount of interference, a first matrix having the calculated output value as an element.

16. The image data processing device according to claim 15, wherein the processor is configured to:

calculate the output value of the pixel of each of the optical filters with respect to the light of each of the band-pass filters on the basis of the spectral characteristics of the subject used in a case where the parameter used in the interference removal process is calculated and the spectral sensitivity characteristics of the image sensor;

calculate a second matrix having the calculated output value as an element; and generate the first data on the basis of the first matrix and the second matrix.

17. The image data processing device according to claim 6, wherein the processor is configured to:

acquire second image data; and correct the second image data using the first data.

18. The image data processing device according to claim 14, wherein the processor is configured to:

calculate the first data on the basis of the information, transmission characteristics of the band-pass filter, and the spectral sensitivity characteristics of the image sensor.

19. The image data processing device according to claim 6, further comprising:

a memory that stores the first data.

20. The image data processing device according to claim 6, wherein the second image data is image data of the subject acquired in an environment in which there is a fluctuation in an amount of light in the transmission wavelength range of the band-pass filter.

21. The image data processing device according to claim 6, wherein the first image data is image data obtained by imaging light of the subject in a development environment, wherein the second image data is RAW image data obtained by imaging light of the subject in a real environment.

22. The image processing device according to claim 21, wherein the third image data is a multispectral image, wherein the second feature amount is spectral characteristics of the subject within the transmission wavelength range of the band-pass filter estimated from the multispectral image, wherein the second information is a slope of the second feature amount.

23. The image processing device according to claim 22,
wherein the processor calculates an interference matrix in
the real environment on the basis of the second infor-
mation and spectral sensitivity characteristics of the
image sensor,
wherein the processor calculates an interference removal
matrix in the specific environment on the basis of an
inverse matrix of the interference matrix in the real
environment,
wherein the processor calculates a crosstalk matrix on the
basis of the interference matrix in the real environment
and the interference removal matrix in the specific
environment to generate correction data as the first
data.

24. An image data processing method for processing
image data obtained by imaging light of a subject, which has
been spectrally separated into a plurality of wavelengths
through a band-pass filter, with an image sensor, the image
data processing method comprising:
a step of acquiring as first image data, which is image data
obtained by imaging light of the subject under an
imaging condition in which a specific environment in
which influence of disturbance light is suppressed;
a step of calculating a feature amount in a transmission
wavelength range of the band-pass filter on the basis of
the first image data; and
a step of calculating information of spectral characteris-
tics of the subject on the basis of the feature amount.

\* \* \* \* \*